US006865334B2

(12) United States Patent
Cooke et al.

(10) Patent No.: US 6,865,334 B2
(45) Date of Patent: Mar. 8, 2005

(54) TERMINATION ASSEMBLY FOR USE IN OPTICAL FIBER HYDROPHONE ARRAY

(75) Inventors: Donald A. Cooke, Greensboro, NC (US); Kenneth M. McGovern, Burlington, NC (US)

(73) Assignee: General Dynamics Advanced Information Systems, Inc., Arlington, VA (US)

( * ) Notice: Subject to any disclaimer, the term of this patent is extended or adjusted under 35 U.S.C. 154(b) by 87 days.

(21) Appl. No.: 10/604,159

(22) Filed: Jun. 28, 2003

(65) Prior Publication Data

US 2004/0264298 A1 Dec. 30, 2004

(51) Int. Cl.$^7$ .................................................. G02B 6/00
(52) U.S. Cl. ...................... 385/139; 385/102; 385/104; 385/109; 385/112; 367/149; 367/153
(58) Field of Search ................................. 385/139, 100, 385/102, 104–107, 109–113, 147; 367/141, 149, 153

(56) References Cited

U.S. PATENT DOCUMENTS

| | | |
|---|---|---|
| 4,193,130 A | 3/1980 | Young et al. |
| 4,297,887 A | 11/1981 | Bucaro |
| 4,379,614 A | 4/1983 | Liertz |
| 4,421,384 A | 12/1983 | McMahon |
| 4,428,645 A | 1/1984 | Korbelak et al. |
| 4,525,818 A | 7/1985 | Cielo et al. |
| 4,556,281 A | 12/1985 | Anderton |
| 4,570,248 A | 2/1986 | Assard |
| 4,593,385 A | 6/1986 | Chamuel |
| 4,714,316 A | 12/1987 | Moore et al. |
| 4,729,625 A | 3/1988 | Loscoe et al. |
| 4,753,499 A | 6/1988 | Malkani et al. |
| 4,767,173 A | 8/1988 | Priaroggia |
| 4,773,728 A | 9/1988 | Kershaw |
| 4,784,459 A | 11/1988 | Jenkins |
| 4,802,724 A | 2/1989 | Fraize et al. |
| 4,818,055 A | 4/1989 | Patterson |
| 4,842,438 A | 6/1989 | Bortolin et al. |
| 4,844,575 A | 7/1989 | Kinard et al. |
| 4,900,121 A | 2/1990 | Becker et al. |
| 4,911,521 A | 3/1990 | Ryuto et al. |
| 4,932,744 A | 6/1990 | Messelhi |
| 4,941,720 A | 7/1990 | Barwig et al. |
| 4,955,012 A | 9/1990 | Bledsoe et al. |
| 4,974,925 A | 12/1990 | Troutman et al. |
| 4,977,546 A | 12/1990 | Flatley et al. |
| 4,998,225 A | 3/1991 | Shajenko |
| 5,005,941 A | 4/1991 | Barlow et al. |
| 5,005,942 A | 4/1991 | Barlow et al. |
| 5,009,474 A | 4/1991 | Wurmser et al. |

(List continued on next page.)

FOREIGN PATENT DOCUMENTS

CA          2320449         4/2001

OTHER PUBLICATIONS

Frederick Su, "Developing Large–Scale Multiplexed Fiber–Optic Arrays for Geophysical Applications," SPIE 1–7 (Sep. 2000).

*Primary Examiner*—Fayez G. Assaf

(57) ABSTRACT

A termination assembly for use in an optical hydrophone module, comprising a module oil seal and an optical fiber seal. The termination assembly is used at the ends of modules and provides a means for filling individual modules with fill fluid. A module oil seal comprises a cylindrical wall defining a cavity, with one end substantially closed and the other end open. An annular face plate on the open end makes a seal dividing a coupling and a clevis. A check valve is mounted to an orifice that passes through the substantially closed end of the module oil seal. Optical fibers pass through the substantially closed end and the optical fiber seal is provided around the optical fiber that passes therethrough. The fiber seal fits snugly in a module oil seal opening. Both components serve to provide a seal that can withstand high pressures and maintain optical fiber integrity.

22 Claims, 21 Drawing Sheets

U.S. PATENT DOCUMENTS

| | | |
|---|---|---|
| 5,074,635 A | 12/1991 | Justice et al. |
| 5,127,076 A | 6/1992 | Lepri et al. |
| 5,134,281 A | 7/1992 | Bryenton et al. |
| 5,140,559 A | 8/1992 | Fisher |
| 5,189,724 A | 2/1993 | Hartley |
| 5,201,019 A | 4/1993 | Gallusser et al. |
| 5,214,732 A | 5/1993 | Beard et al. |
| 5,218,418 A | 6/1993 | Layton |
| 5,235,665 A | 8/1993 | Marchesi et al. |
| 5,241,611 A | 8/1993 | Gould |
| 5,265,183 A | 11/1993 | Feng et al. |
| 5,278,933 A | 1/1994 | Hunsinger et al. |
| 5,285,424 A | 2/1994 | Meyer |
| 5,295,219 A | 3/1994 | Koya et al. |
| 5,317,544 A | 5/1994 | Mass et al. |
| 5,321,778 A | 6/1994 | Com-Nougue et al. |
| 5,341,448 A | 8/1994 | Huebscher |
| 5,367,594 A | 11/1994 | Essert et al. |
| 5,381,382 A | 1/1995 | Marschall |
| 5,419,636 A | 5/1995 | Weiss |
| 5,434,944 A | 7/1995 | Kerry et al. |
| 5,457,764 A | 10/1995 | Edera |
| 5,475,216 A | 12/1995 | Danver et al. |
| 5,481,639 A | 1/1996 | Cobb et al. |
| 5,504,719 A | 4/1996 | Jacobs |
| 5,532,979 A | 7/1996 | Hansen et al. |
| 5,602,952 A | 2/1997 | Rashleigh et al. |
| 5,657,405 A | 8/1997 | Fujiwara |
| 5,657,412 A | 8/1997 | Caudrelier |
| 5,668,779 A | 9/1997 | Dandridge et al. |
| 5,671,191 A | 9/1997 | Gerdt |
| 5,677,976 A | 10/1997 | Takahashi |
| 5,689,605 A | 11/1997 | Cobb et al. |
| 5,701,370 A | 12/1997 | Muhs et al. |
| 5,734,623 A | 3/1998 | Ruffa |
| 5,745,633 A | 4/1998 | Giebel et al. |
| 5,748,565 A | 5/1998 | Cherbettchian et al. |
| 5,790,740 A | 8/1998 | Cloud et al. |
| 5,796,908 A | 8/1998 | Vicory |
| 5,802,237 A | 9/1998 | Pulido |
| 5,825,963 A | 10/1998 | Burgett |
| 5,838,871 A | 11/1998 | Libert et al. |
| 5,872,876 A | 2/1999 | Kluth et al. |
| 5,892,877 A | 4/1999 | Meyerhoefer |
| 5,894,536 A | 4/1999 | Rifkin et al. |
| 5,930,203 A | 7/1999 | Sansone |
| 5,946,440 A | 8/1999 | Puetz |
| 5,963,692 A | 10/1999 | Marazzi et al. |
| 5,963,699 A | 10/1999 | Tanaka et al. |
| 6,043,917 A | 3/2000 | Sonderegger et al. |
| 6,580,033 B1 | 6/2003 | Goldner et al. |
| 2003/0179651 A1 * | 9/2003 | Nutt et al. .................... 367/25 |

* cited by examiner

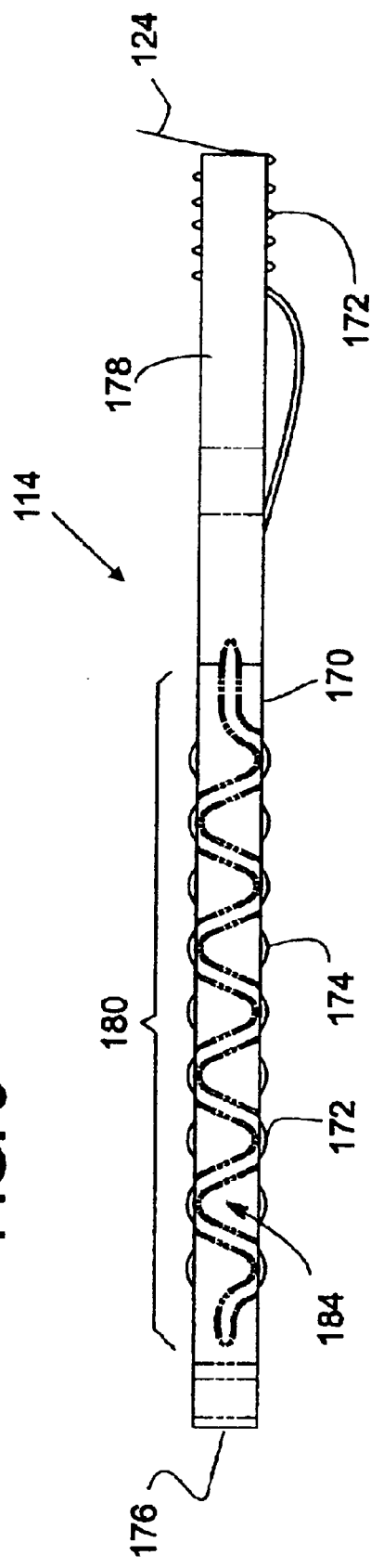
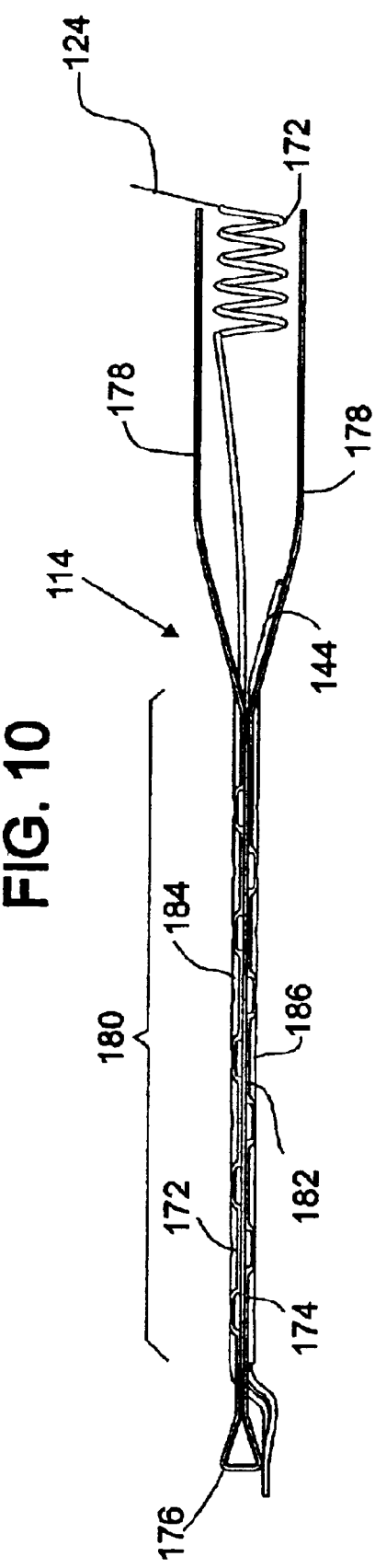
FIG. 9
FIG. 10

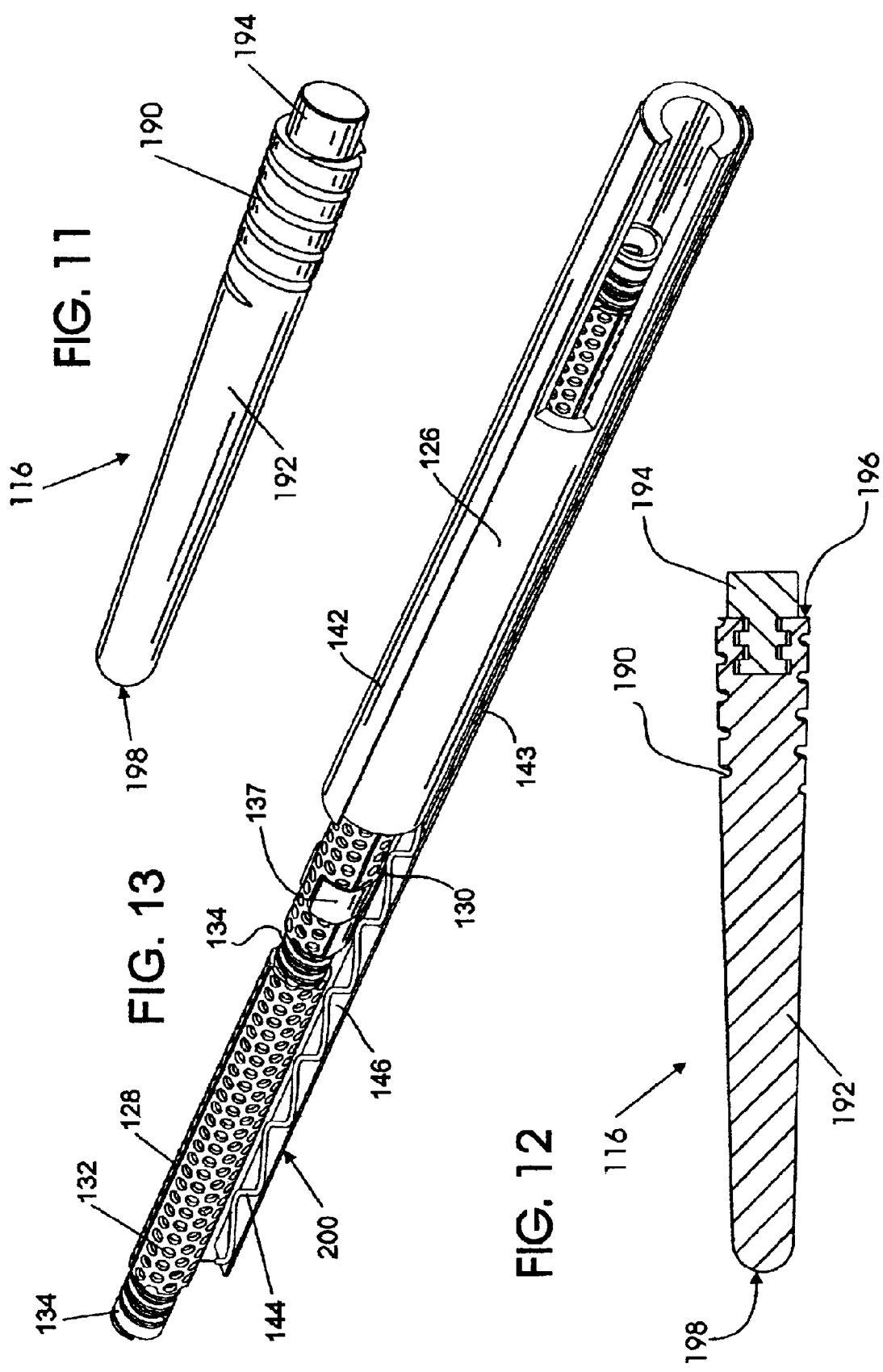

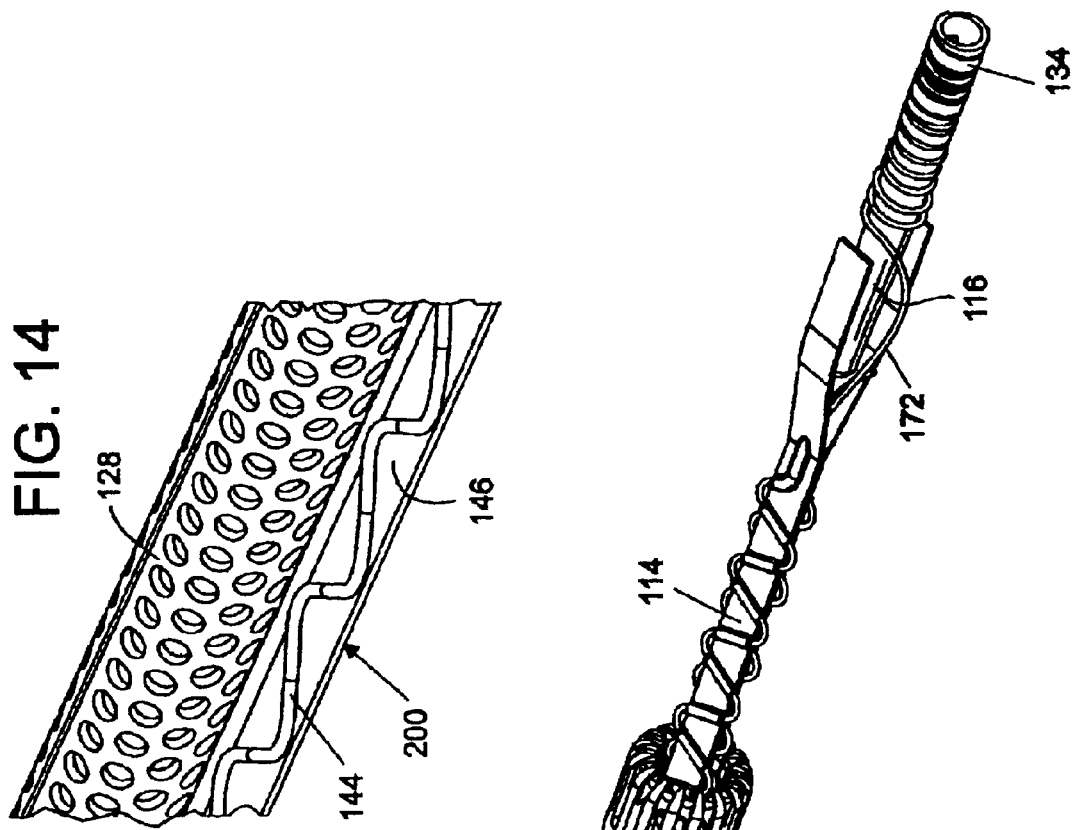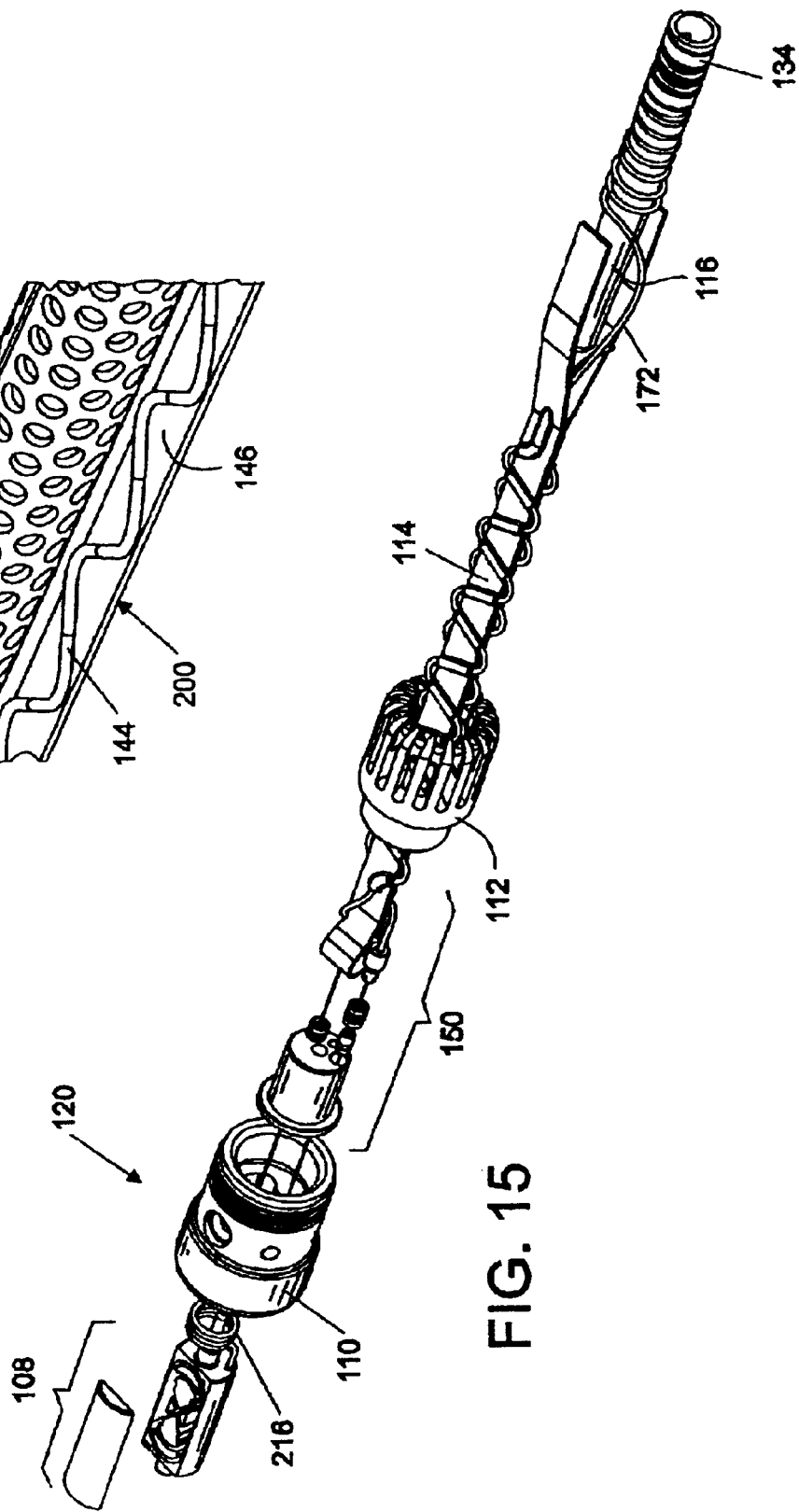

TERMINATION ASSEMBLY FOR USE IN OPTICAL FIBER HYDROPHONE ARRAY

FEDERAL RESEARCH STATEMENT

This invention was made with Government support under Contract N00024-98-C-6308. The Government has certain rights in this invention.

BACKGROUND OF INVENTION

The science of underwater sonar equipment is increasingly relying on the use of fiber-optic technology. This reliance is driven by the requirement to have more acoustic sensors per sonar system, with higher sensitivities and lower cost.

Passive sonar arrays towed from submarines or surface ships are excellent candidates for fiber-optic sensor technology. In this area, an all optical fiber hydrophone assembly is a recent development by the United States Naval Research Laboratories. The hydrophone assembly consists of a series of air-backed plastic cylinders, called mandrels, which are helically wrapped with optical sensing fiber. The hydrophone senses sound pressure levels through the strain induced in the optical sensing fiber as the sound pressure wave deforms the mandrel. Strain is imparted in the fiber in direct proportion to the pressure induced strain in the mandrel. The characteristics of the light signal transmitted through the fiber change in relation to the strain in the fiber, allowing measurement of the sound pressure level based on the change in the light signal. The mandrels are interconnected by axial interconnect springs to form a line of mandrels that make up the hydrophone assembly. The hydrophone assembly is integrated into a discrete thin-line acoustic module. Modules typically range from 50 to 250 feet in length. End-to-end connection of modules forms long optical hydrophone sonar arrays. Bulkhead couplings are located at each end of the modules and provide connections between adjacent modules. The active sensing hydrophone fiber must transition into and through the module couplings. This requires the interconnection of optical fibers.

While large bandwidth capabilities and small size make optical fibers desirable for use, optical fibers are mechanically fragile. Tow-induced loads may cause the fibers to fracture. Such loads may be induced in deployment and recovery operations of the acoustic array, in towing of the acoustic array by drag loading induced elongation, and in bending of the optical fiber. The optical fiber is bent when the optical hydrophone sonar array is wound on a handling system reel. Radial compressive loads may cause degraded light transmission as the result of a phenomenon known as microbending loss. Stress corrosion is another cause of failure of optical fibers, and is a stress-accelerated chemical reaction between the optical fiber glass and water that can result in microcracks in the glass, adversely effecting fiber performance.

To accommodate desired growth in the field of optical fiber hydrophones, it is necessary that new apparatus and methods for use with optical hydrophone sensor technology be developed to protect the fibers from mechanical failure. For example, while the optical fiber is relatively well protected while wound on the hydrophone mandrels and interconnect springs, there is a need for a reliable means of transitioning optical fibers on and off the optical hydrophone assembly in the critical areas at each end of the module where the fiber transitions to the bulkhead coupling. There is also a need for protecting the optical fibers as they make the transition from the optical hydrophone sensors to optical-mechanical terminations that provide interconnectivity through the bulkheads to other towed sonar array modules.

Optical fibers serving individual modules are limited in the number of light transmission channels available for communication with the monitoring equipment in the vessel. Multiple optical fibers may therefore be required to service an entire hydrophone array. These bypass fibers are needed in order to serve aft modules in the hydrophone array. Optical fibers that service modules aft of the forward module must bypass the hydrophone assembly of one or more modules by a route outside of the hydrophone assembly, creating the need for protection of the bypass fibers. The bypass fibers are aligned with the module central axis proximate to each end of the module. The bypass fibers transition to be substantially parallel to the module central axis and alongside the hydrophone assembly. Bypass fibers must be protected from strain resulting from tow speed induced-drag loading. Reliable end terminations are also required.

Modules require a fill fluid in order to have neutral buoyancy. Means for filling the module that provide a seal for both the module and for the fiber that passes through the module seal are needed. There is also a need for improvement in the physical connections between the optical fibers of adjacent modules. Existing optical towed sonar arrays use various configurations of standard optical connector technologies. Specially designed optical-mechanical connectors are available, but require large physical space envelopes, both in diameter and length. Such connectors include fiber splice trays, which are commercially available, but are too large for retrofitting into thin-line towed sonar arrays.

A general splicing technique with proven reliability is also needed. Fiber splicing is a necessary step in integrating prefabricated subcomponents of hydrophone assemblies into the towed array optical module assembly. The optical fiber end terminations should be fabricated off-line, eliminating the need, and the risk of damage, for integrating the active sensing fiber into the end termination components. The splicing apparatus should also be effective in repairing an optical fiber break during the hydrophone winding process during fabrication of the optical hydrophone assembly.

SUMMARY OF INVENTION

The present invention is for use in an optical hydrophone module, and more specifically, at the ends of modules. A termination assembly according to the present invention provides a means for filling individual modules with fill fluid, as well as providing a hydrostatic module and optical fiber seal at the forward and aft bulkhead coupling within a module assembly. Fill fluid may be injected or removed prior to integration into a full towed acoustic array module string. Each module may be independently fabricated, optically tested, and oil filled for neutral buoyancy, supporting interchanging of modules in towed sonar arrays. The integrity of the optical fiber is maintained as it passes through the seal.

A termination assembly according to the present invention comprises two integrated components, an oil module seal, and an optical fiber seal. The termination assembly is located at each end of a module within a clevis and an intermodule bulkhead coupling threaded to the clevis. The termination assembly comprises a module oil seal, having a cylindrical wall defining a cavity with one end substantially closed and the other end open. The open end has an annular face plate extending outwardly from the periphery of the wall. The face plate surface distal from the module oil seal is a face seal. One orifice adapted to receive a check valve passes through the substantially closed end of the module oil seal. An O-ring fits around the face seal and abuts a surface of the bulkhead coupling to make a seal. There is also at least one opening through the substantially closed end for receiving optical fibers.

In further accordance with the present invention, an optical fiber seal seals the opening around the optical fiber that passes through the module oil seals substantially closed end. The fiber seal fits snugly in the module oil seal opening. The fiber seal has a substantially cylindrical wall defining a void through which bare optical fibers pass. The fiber seal has an O-ring at one end that forms a seal with the module oil seal. Potting compound is used within the fiber seal for sealing between the optical fibers and the wall of the fiber seal. A fiber seal retainer is threaded into the module oil seal opening over the fiber seal. A tube containing one or more optical fibers extends from a woven fiber protection cable assembly to the fiber seal retainer. The woven fiber protection cable assembly comprises a woven fiber protection cable with optical fibers inside tubes attached to the cable in a sinusoidal pattern. A compressive tube stop is placed over the tube and fills the void between the tube and the fiber seal retainer. A retainer cap is threaded over the fiber seal retainer.

In some embodiments the present invention further comprises a retractable coiled tube housed within the cavity, adapted to receive optical fibers from the woven fiber protection cable assembly. The connection between the clevis and the bulkhead coupling compresses the O-ring seal and mechanically restrains the module oil seal. The substantially closed end of the module oil seal is fastened to a looped end of the woven fiber protection cable. Also provided in accordance with the present invention is an optical fiber hydrophone module having a termination assembly.

A method of assembling a termination assembly is also provided. Steps include providing an oil module seal, inserting the module oil seal into the clevis with the face plate remaining outside the clevis, and providing an O-ring that makes a seal when the intermodule bulkhead coupling is mounted to the clevis. Steps may further comprise inserting a check valve in an orifice in the module oil seal closed end, providing a retractable coiled tube in the cavity to receive optical fibers, fastening the module oil seals substantially closed end to the looped end of the woven fiber protection cable, and filling the module through the check valve with module fill fluid.

The method of assembling a termination assembly also includes steps related to the fiber seal. These steps include inserting a fiber seal into the module seal opening to form a seal with the fiber seals O-ring, packing the void in the fiber seal with potting compound to seal between the optical fibers and the interior surface of the fiber seal, and threading a fiber seal retainer over the fiber seal. A tube from the woven fiber protection cable assembly extends to the fiber seal, and a compressive tube stop is mounted to an end of the fiber seal retainer to hold the tube in position with its compressed slotted end. A retainer cap is then threaded to the fiber seal retainer, enclosing the compressive tube stop.

Features and advantages of the present invention will become more apparent in light of the following detailed description of some of the embodiments thereof, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF DRAWINGS

For a more complete understanding of this invention reference should now be had to the embodiments illustrated in greater detail in the accompanying drawings and described below.

FIG. 9 is a plan view of the woven fiber protection cable assembly of FIG. 8.

FIG. 10 is an elevation view of the woven fiber protection cable assembly of FIG. 8.

FIG. 11 is a perspective view of a fiber transition segment of the present invention, used in the embodiment of FIG. 2.

FIG. 12 is a section view taken along the longitudinal axis of the fiber transition segment of FIG. 11.

FIG. 13 is a perspective view of a fiber bypass assembly of the present invention.

FIG. 14 is an enlarged perspective view of the embodiment of FIG. 13.

FIG. 15 is an exploded perspective view of one end of the embodiment of FIG. 2

DETAILED DESCRIPTION

Certain terminology is used herein for convenience only and is not to be taken as a limitation on the invention. For example, words such as forward, aft, upper, lower, left, right, horizontal, vertical, upward, and downward merely describe the configuration shown in the Figures. The components may be oriented in any direction and the terminology, therefore, should be understood as encompassing such variations unless specified otherwise. Also, the scope of the invention is not intended to be limited by the materials or dimensions listed herein, but may be carried out using any materials and dimensions that allow the construction and operation of the hydrophone module.

Figure 1:
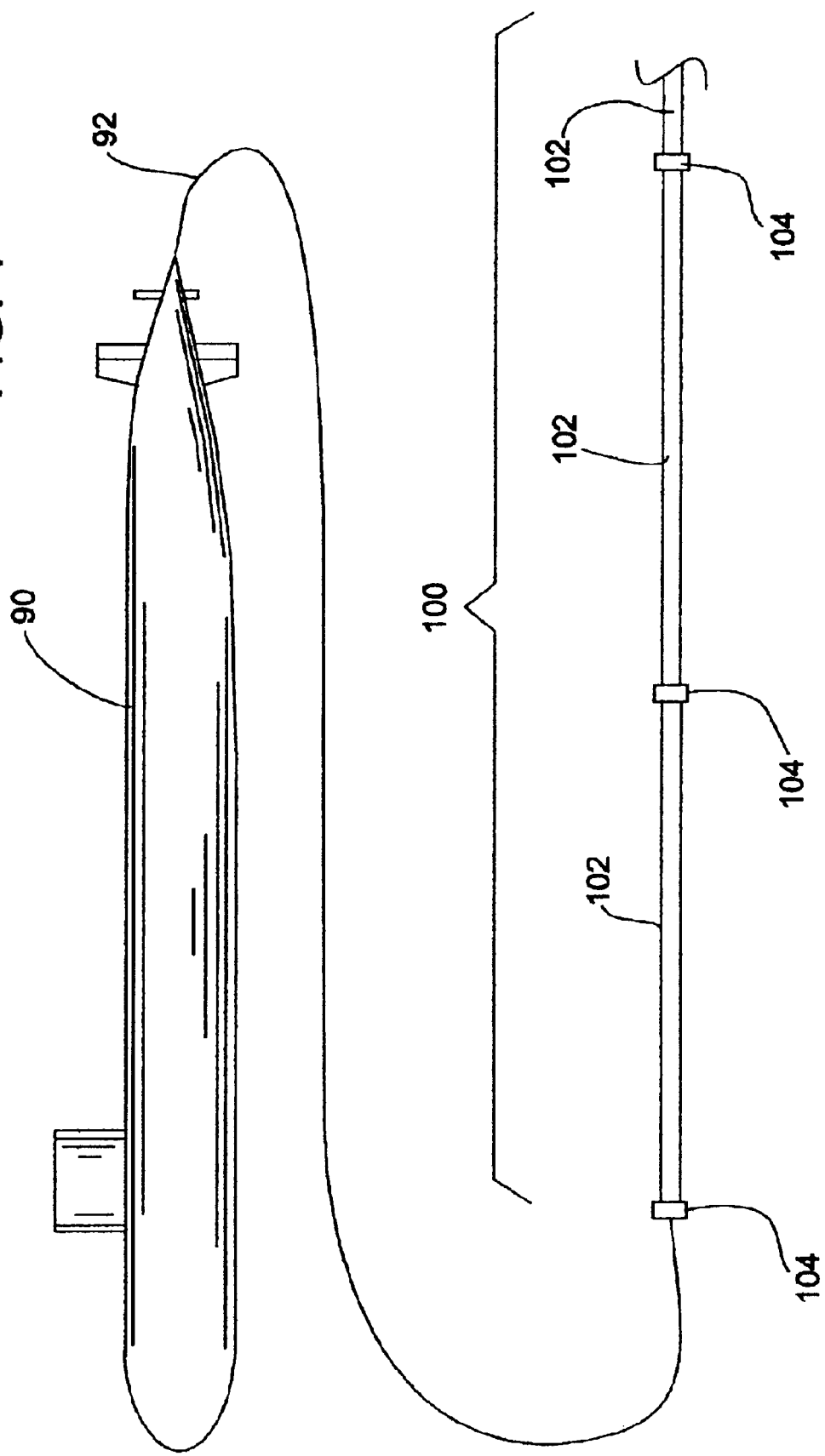
FIG. 1 is an elevation view of a submarine towing a hydrophone array.

Referring now to the drawings, wherein like reference numerals illustrate corresponding or similar elements throughout the several views, there is shown in FIG. 1 a submarine 90 using a tow cable 92 to tow an optical hydrophone sonar array 100. The hydrophone array 100 is a linear array of modules 102 connected end-to-end. Intermodule mechanical connectors 104 fasten the modules 102 together and to the tow cable 92. A ship could also tow the array 100. The modules 102 may range in length from 50 feet to over 250 feet, and arrays 100 are commonly several hundred to several thousand feet in length.

Figure 2:
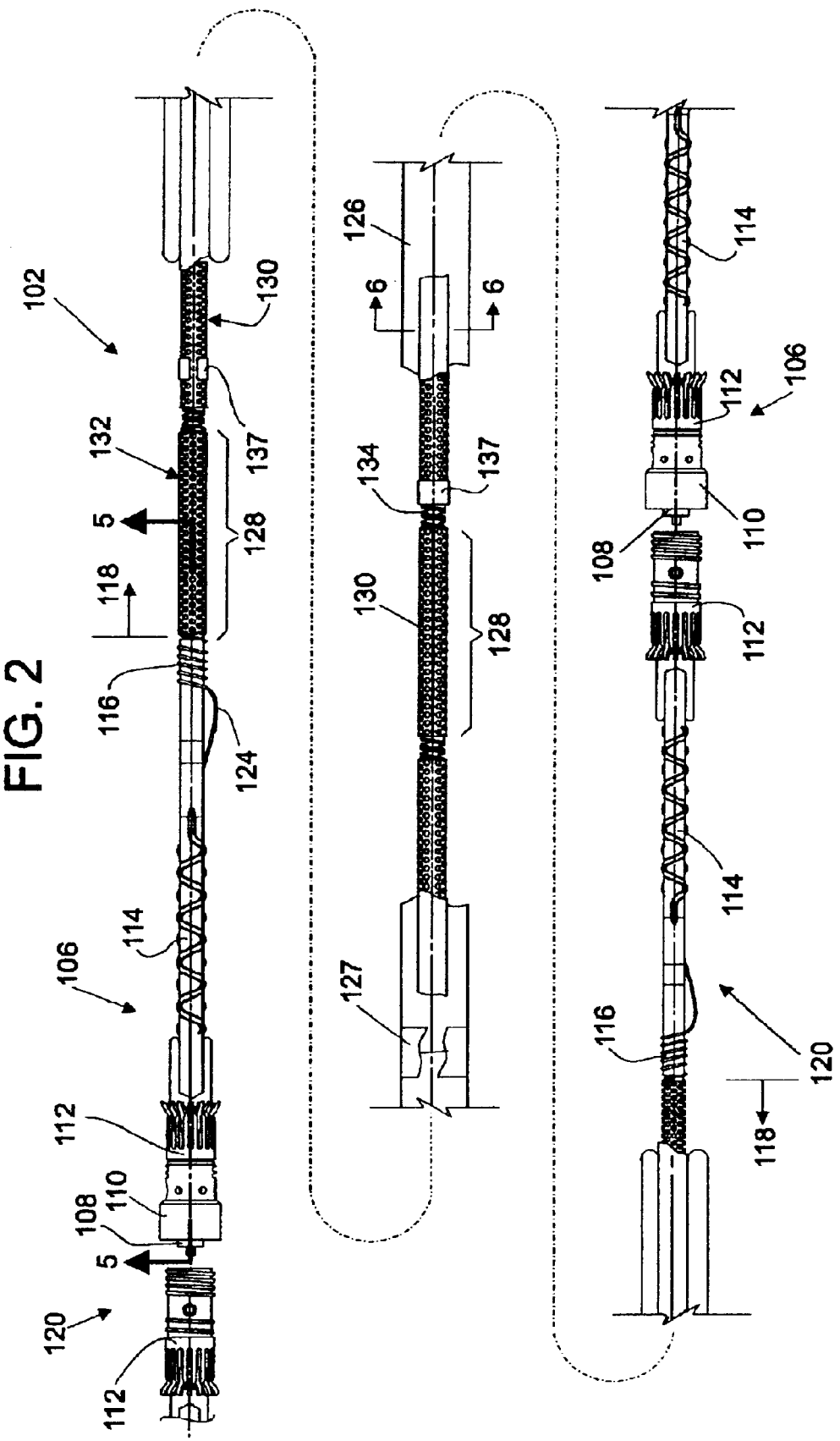
FIG. 2 is a plan view of a hydrophone module with some elements cut away, illustrating some of the elements of the present invention.
Figure 3:
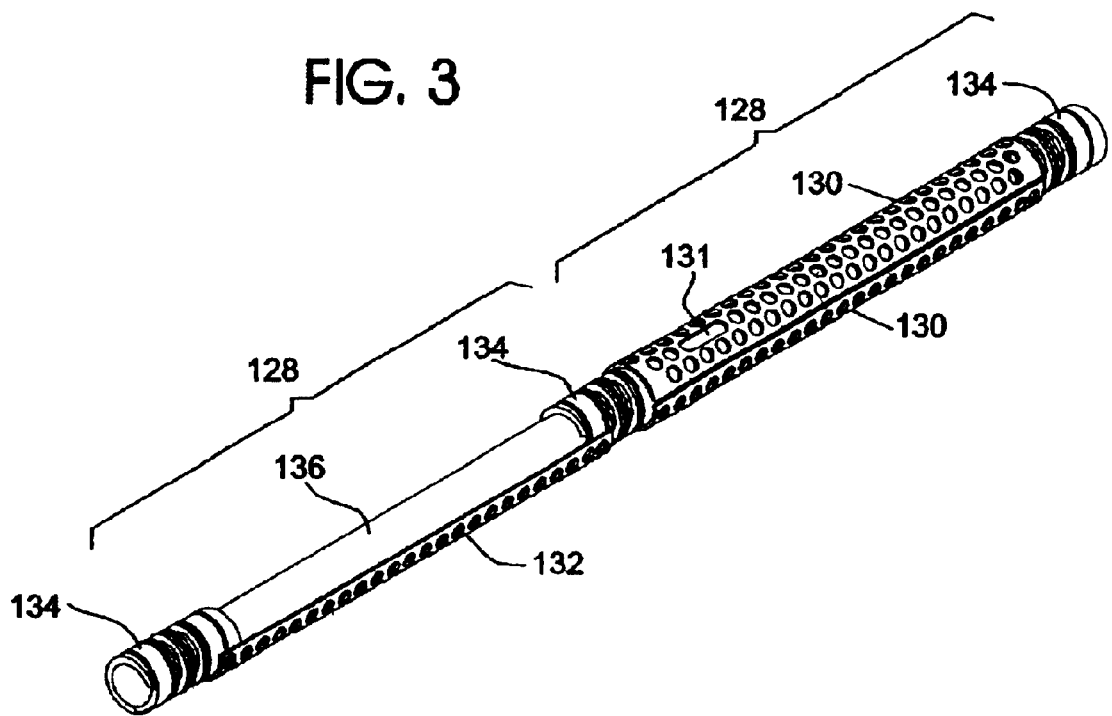
FIG. 3 is a perspective view of a hydrophone segment.

A module 102, shown in FIG. 2, comprises at a forward end 106 a fiber splice tray 108, a female bulkhead coupling 110 that is part of the intermodule mechanical connector 104 shown in FIG. 1, a clevis 112, woven fiber protection cable assembly 114, and a fiber transition segment 116, then a hydrophone assembly 118, and at the aft end 120 a fiber transition segment 116, a woven fiber protection cable assembly 114, a clevis 112, and a male bulkhead coupling 121 that with the adjacent female bulkhead coupling 110 comprises the intermodule mechanical connector 104. The male bulkhead coupling 121 may be designed by one of ordinary skill in the art to mate with a female coupling. Optical sensing fiber 124, shown in FIG. 2 within tubing, spans the length of the module. The module 102 is surrounded by a hollow cylindrical open pore polyurethane foam 126, split longitudinally to allow it to be placed around the hydrophone assembly 118. Gabardine weave polyester cloth may be used with adhesive tape to connect adjacent portions of foam. FIG. 3 shows a hydrophone assembly 118 with two hydrophone segments 128. The two hydrophone segments 128 each comprise an air-backed plastic mandrel 136 and semi-circular steel cages 130, 132 that encapsulate and protect the mandrels 136 (one is removed to expose the mandrel 136). Interconnect springs 134 connect hydrophone segments 128.

The air-backed plastic mandrels 136 are acoustically sensitive hollow cylinders that may be fabricated from a polycarbonate resin such as LEXANÂ®104 (LEXAN is a registered trademark of General Electric Plastics). In one embodiment, the mandrels 136 have a ⅜ inch outside diameter and are approximately 4.5 inches long. The mandrels 136 are plugged at each end (plugs not visible) with plugs made of the same material as the mandrel 136, solvent bonded to the mandrel 136. The optical fiber may be a low bend loss single mode fiber.

The perforated steel cage halves 130, 132 surround and protect the mandrels 136. The steel cage halves 130, 132 may be fabricated from 40 percent open, 18 or 20 gauge, staggered perforated low carbon steel sheet. Some of the steel cage halves 130 are slotted 131, while other steel cage halves 132 are not slotted. Slotted cage halves are placed at the forward, mid and aftmost channels of the hydrophone assembly 118 to allow use of tape at those locations or at any desired interval as deemed appropriate by one skilled in the art.

The plastic interconnect spring 134 (FIG. 4) connecting the mandrels may also be the same material type as the mandrels 136. Solvent bonding is used to connect the mandrels 136 and springs 134. The interconnect springs 134 mechanically separate the individual mandrels 136, providing points of flexure for the assembly 118, and facilitate the handling of long continuous hydrophone assembly lengths. Optical fiber is received in a groove 135 in the interconnect springs 134 to transition the optic fiber from one mandrel 136 to the next. The pitch and dimension of the helical void 137 may be as selected by one of ordinary skill in the art.

Figure 5:
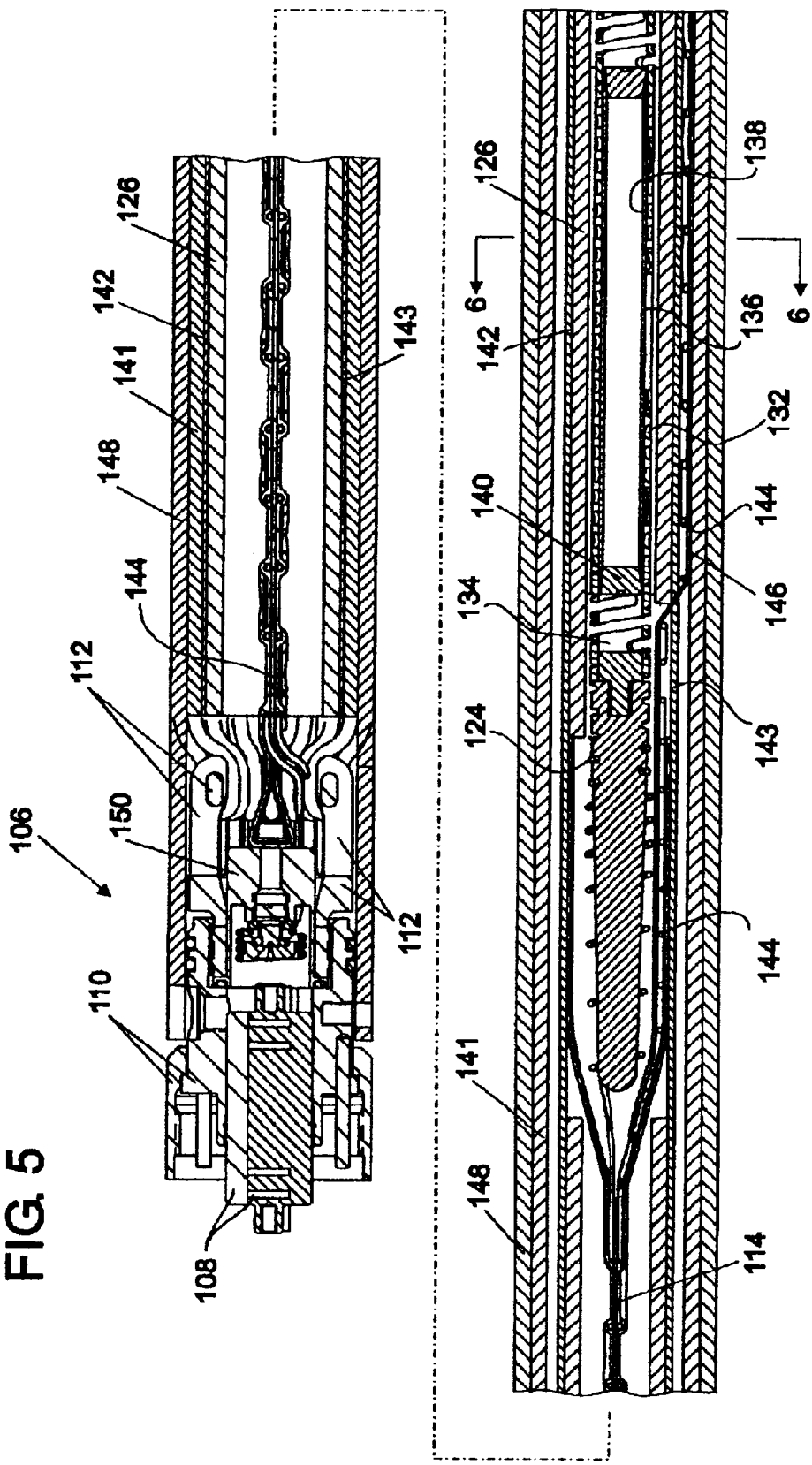
FIG. 5 is a longitudinal section view of the hydrophone module taken along line 55 of FIG. 2.
Figure 6:
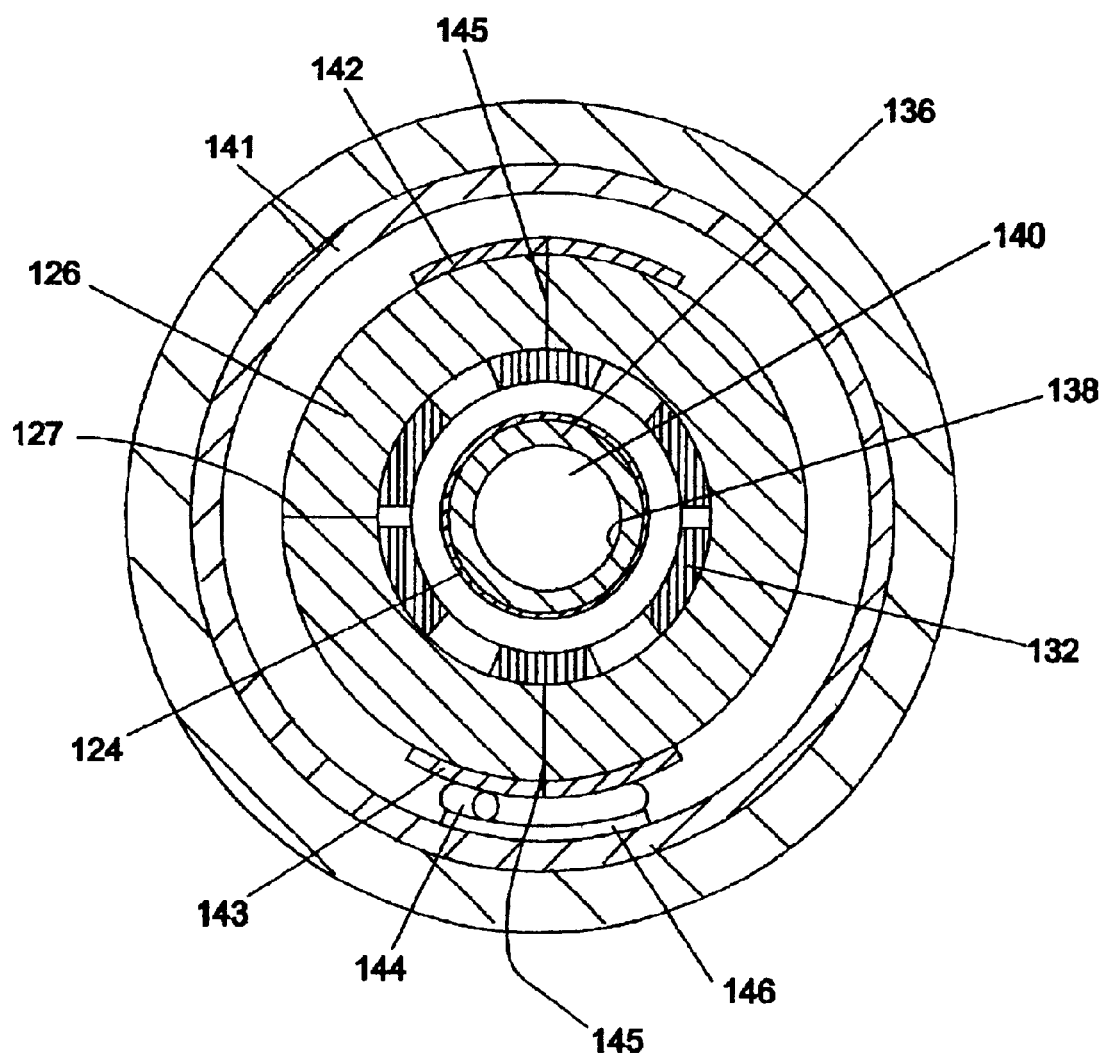
FIG. 6 is a cross-section view of the hydrophone module taken along line 66 of FIG. 2.

Several additional components of the module appear in FIGS. 5 and 6. The air-backed mandrel 136 inside surface 138 defines a cylindrical void terminated at each end of the mandrel with a plug 140. An internal strength member assembly is designed to carry the load applied to the module 102 and comprises an internal strength member 141. The internal strength member 141 is a woven member of aramid fibers that surrounds the hydrophone assembly 118 and is attached to each clevis 112 and includes two positioning tapes 142, 143. Certain components of the hydrophone assembly 118 are fastened to the two positioning tapes 142, 143 within the internal strength member 141 in order to maintain their relative positions, including the foam 126 with polyester thread 145. In FIG. 5 the optical sensing fiber 124 is only shown in tubing; no bare sensing fiber is shown.

A bypass cable assembly comprises additional jacketed optical fibers, which are bypass fibers 144, attached to a woven cable 146. The woven bypass cable 146 carries the bypass fibers 144 to aft modules by transitioning the fibers from the forward woven fiber protection cable assembly 114, around the hydrophone assembly 118 outside of the foam 126, to the aft woven fiber protection cable assembly 114. A hose 148 is pulled over the entire assembly and fastened to the female bulkhead coupling 110 and male bulkhead coupling 121 (FIG. 2) at each end. A termination assembly 150 resides within the bulkhead couplings 110, 121.

Figure 7:
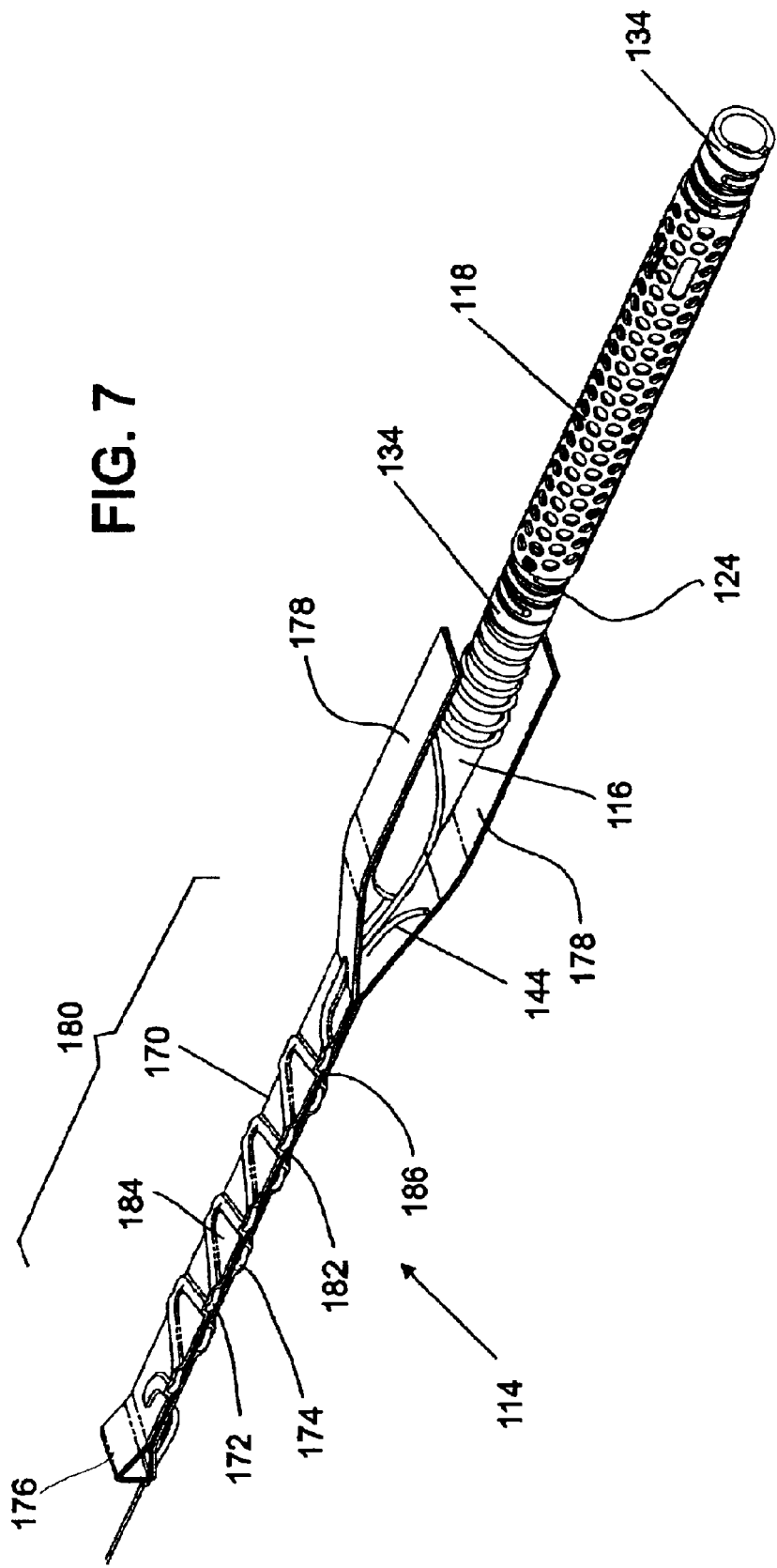
FIG. 7 is a perspective view of the woven fiber protection cable assembly, fiber transition segment, and hydrophone assembly used in the embodiment of FIG. 2.

The fiber transition segment 116 and the woven fiber protection cable assembly 114 are integrated as shown in FIG. 7 for use in the present invention. Together these elements protect the optical sensing fiber as it transitions between the central axis of the module 102 and the hydrophone assembly 118 at both ends of the module.

Figure 8:
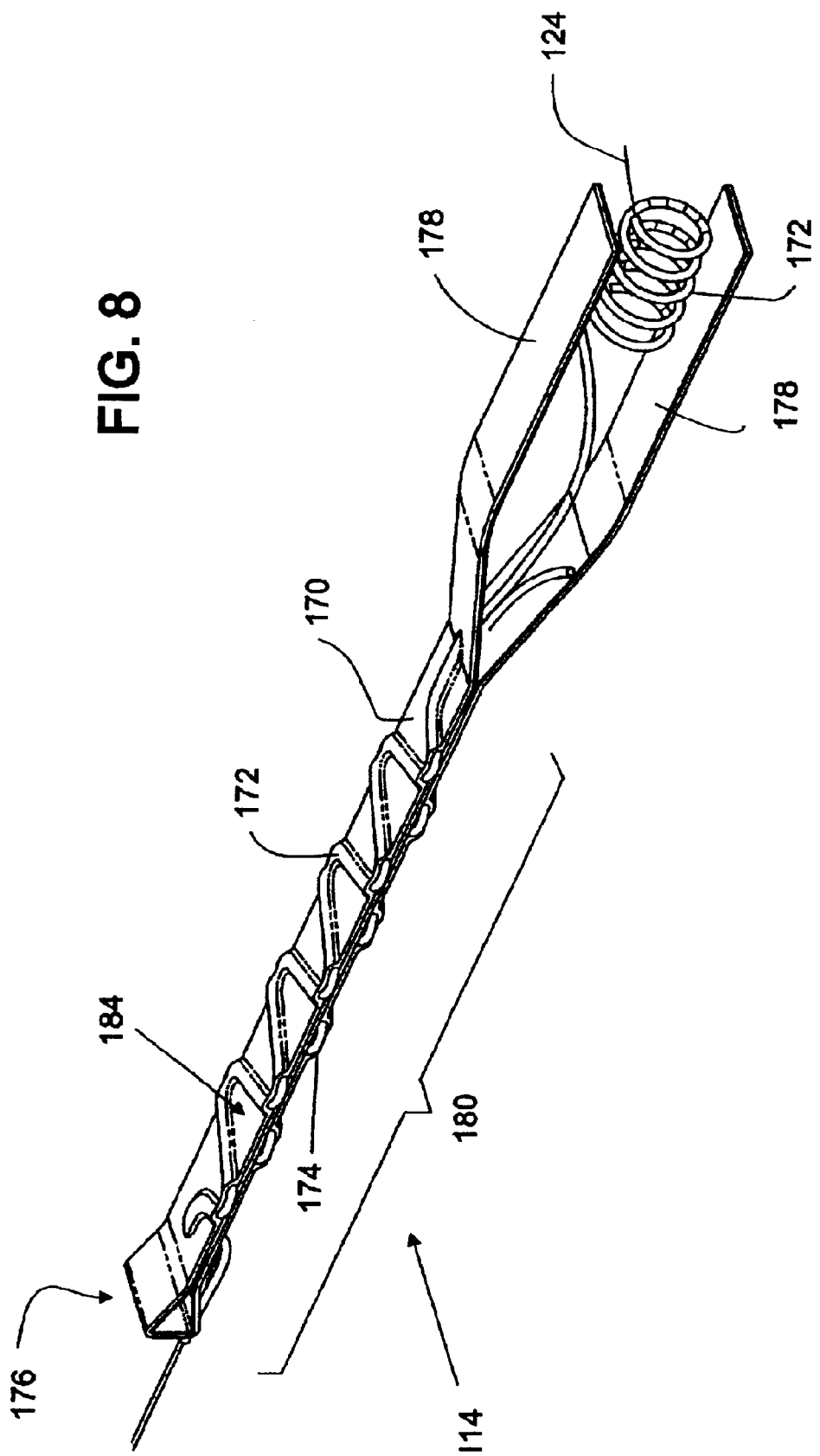
FIG. 8 is a perspective view of a woven fiber protection cable assembly of the present invention used in the embodiment of FIG. 2.

The woven fiber protection cable assembly 114 is shown in FIGS. 8, 9, and 10. The woven fiber protection cable assembly 114 includes a woven fiber protection cable 170 and etched polytetraflouroethylene (PTFE, such as TEFLON® TEFLON is a registered trademark of the DuPont Corporation) tubing 172, 174. One tube 172 contains the optical sensing fiber and the other tube 174 contains bypass fibers (described below). The woven cable 170 is an elastic member comprising a plurality of parallel elastic strands knitted together. The elastic member is fabricated from parallel strands of elastane (spandex) elastic fibers (such as LYCRA®; LYCRA is a registered trademark of the DuPont Corporation). A single ply polyester yarn is utilized to knit the elastic strands together. The ultimate elongation of the woven elastic is specified to be a minimum of 50 percent. The cable 170 may be approximately 0.50-inches wide.

The tubing 172, 174 may be, for example, either 21 or 22 gauge. The tubing 172, 174 is installed in the cable 170 using a sinusoidal integration scheme. At one end the woven cable 170 is configured to have a loop 176, and at the other end the two ends 178 of the cable 170 are initially free and extend to either side of the fiber transition segment (not shown). The middle portion 180 of the cable 170 has three layers, a center layer 182 and two outside layers 184, 186. The tubing 172, 174 is inserted between the center layer and outer layers 184, 186 in a sinusoidal pattern with a period of 0.50 to 0.55 inches. The tubing 172, 174 extends over the edges of the cable by approximately 0.05 inches. The end of the tubing 172 proximate to the fiber transition segment 116 is formed into a retractable coil. This design provides protection to the fiber 124 along with the ability to elongate and retract during variations in speed of the tow vessel. A length of optical fiber 124 is installed within the coiled tubing 172 for containment, protection and subsequent splicing with the hydrophone assembly 118.

The woven fiber protection cable assembly 114 may be made by folding a length of cable in half, making a loop 176 at the folded end, inserting the center layer 182 in the middle section 180, and separating the free ends 178 that go around the fiber transition segment 116. The outside layers 184, 186 of the cable 170 are sewn to the center layer 182 along each side, using two-ply textured polyester yarn.

The woven fiber protection cable assembly 114 provides a means for transitioning optical fibers from the optical hydrophone assembly 118 and bypass fiber cable (described below) assemblies to the bulkheads (for example, see forward bulkhead 110 in FIG. 5), which allows intermodule connectivity. The fiber is protected from the point at which it transitions from the hydrophone assembly 118 where the fiber starts into or exits its helical pitch, a point where the fiber would otherwise be susceptible to breakage, to the central axis of the module assembly 102 and into and through the module bulkhead coupling 110, and clevis 112. The woven fiber protection cable assembly 114 also provides the necessary capability to elongate and retract during variations of tow speed induced drag loading without imparting strain on the fiber.

Figure 4:
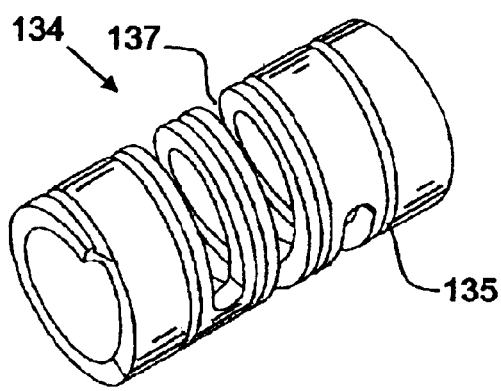
FIG. 4 is a perspective view of an interconnect spring used in the hydrophone segment of FIG. 3.

The fiber transition segment 116, shown in FIGS. 7, 11 and 12, transitions the optical sensing fiber 124 between the central axis of the module 102 and the hydrophone assembly 118, and is mounted to interconnect springs 134 at both the forward 106 and aft 120 ends of the hydrophone assembly, as shown in FIG. 2. The transition segment 116 has an internal groove 190 that is aligned with and has approximately the same pitch as the interconnect spring groove 135 (FIG. 4). The fiber transition segment conical portion 192 is molded around an insert 194 that is the same material as the interconnect spring 134. The insert 194 is solvent bonded to the interconnect spring 134 thereby connecting the fiber transition segments 116 to the end of the hydrophone assembly 118 for transitioning the optical sensing fiber 124 from the hydrophone assembly 118.

The transition segment 116 functions as bend strain relief to provide a smooth transition for the fiber 124 across the edge face of the cylindrical mandrel 136 and interconnect spring 134. Mathematically modeling the transition segment 116 as a bend strain relief as known by one of ordinary skill in the art may be performed to define the material properties (i.e., elastic modulus) and shape of the transition segment 116 given the root diameter at its base 196, minimum bend radius, and the fiber diameter. Given a root diameter of 0.5 inches, for one embodiment a material with an elastic modulus of 8,400 psi was required. The 0.5-inch root diameter was required in order to provide a smooth transition from the interconnect spring 134 to the transition segment 116. The smaller end 198 of one embodiment of the transition segment 116 has a 0.312-inch diameter, with an end rounded at a 0.16-inch radius. The conical portion 192 of this transition segment 116 is 3.5 inches long. A 90-A durometer polyurethane may be used for fabrication due to its molding characteristics and its compatibility with the module fill fluid, and may be molded around a LEXAN® 104 insert 194 to allow solvent bonding to the adjacent interconnect spring 134. The portion of the insert 194 that extends from the conical portion 192 of the transition segment 116 has an outside diameter that matches the inside diameter of the interconnect spring 134.

The transition segment 116 interfaces with the interconnect spring 134 affixed to the last hydrophone mandrel at each end of the hydrophone assembly 118. The groove 135 in the spring 134 on the last mandrel at each end of the hydrophone assembly 118 is aligned with the groove 190 in the transition segment 116 and solvent bonded. The hydrophone fiber (not shown) transitions from the last hydrophone mandrel by continuing the spiral rotation of the fiber off of the interconnect spring 134 and onto the transition segment 116. The bare fiber is laid along the helical groove 190 in the transition segment 116 for two to three revolutions. The coiled portion of the optical sensing fiber tube 172 is wound into the grooves 190 of the transition segment 116 for two to three revolutions. The fiber then transitions into the protective tube 172. The tube 172 continues along the helical groove 190 for two to three additional revolutions. Both the bare fiber and the etched PTFE tube 172 are bonded in the groove 190. The tubing 172 exits out of the molded groove 190 into several (three to five) free retractable coils. The tube 172 with the optical sensing fiber inside is then integrated with the woven fiber protection cable assembly 114. A service length of optical fiber is maintained in order to allow for splicing to the optical hydrophone assembly 118.

The transition segment 116 provides a controlled means of gradually transitioning the fiber to or from a wound helix to an otherwise straight configuration. The fibers are protected within the tube 172, as they exit the transition segment 116 and pass through the woven fiber protection cable assembly 114 into the module bulkhead coupling 110 and clevis 112.

As shown in FIGS. 13 and 14, the bypass cable assembly 200 protects optical bypass fibers, and includes a jacketed bundle of bypass fibers 144 attached to a woven cable 146. The bypass cable assembly 200 provides the capability to transition any number of fibers 144 within the module 102 around the hydrophone assembly 118 to service aft modules 102. The fibers 144 that service aft modules 102 must pass along side the preceding optical hydrophone assembly 118 without being damaged. The bypass cable assembly 200 provides a protected and reliable means of transitioning a bundle of optical fibers 144 from the forward most bulkhead coupling 110 to the aft most clevis 112 within a module 102. This design component also provides the necessary capability to elongate and retract during variations of tow speed induced-drag loading without imparting strain on the fiber.

Bypass fibers run parallel to the hydrophone assembly to serve as the active-sensing fiber for subsequent and discrete blocks of additional hydrophone channels in aft modules. A number of individual bypass fibers are packaged into the single jacketed bundle 144, with the jacket in one embodiment being made of a thermoplastic polyether elastomer (such as HYTREL®; HYTREL is a registered trademark of the DuPont Corporation), with an integrated strength member made of para-aramid fiber produced from polyparaphenylene terephthalamide (such as KEVLAR®; KEVLAR is a registered trademark of the DuPont Corporation). This package of bundled fibers 144 is attached in a sinusoidal attachment integration scheme to the woven cable 146 that spans the entire length of the module 102. In one embodiment, the bundled bypass fibers 144 are also attached to the woven fiber protection cable 114, and because the bypass fibers 144 are already jacketed, the PTFE tubing used on the optical sensing fiber 124 along the woven fiber protection cable 114 is not needed on the bypass fibers 144. The bypass cable 146 is woven from 15 parallel strands of elastane (LYCRA® elastic) having a diameter of 0.012 inches. A single ply polyester yarn is utilized to knit the elastic strands together. Two strands of single ply liquid crystal polymer thermoplastic multifilament fiber (such as VECTRAN®; VECTRAN is a registered trademark of Hoechst Celanese Corporation) are woven into the cable 146 along the borders to establish the ultimate elongation of the woven cable 146, which is a minimum of 10 percent. These features provide the necessary elongation characteristics so that the bypass fibers 144 are not strained or broken as a result of towing at high speed.

The two positioning tapes 142, 143 of the internal strength member assembly run the length of the module and are attached to devises 112 at each end. In one embodiment the tapes are 0.5-inch wide and are made of a synthetic thermoplastic, such as nylon. The woven cable 146 with its integrated fiber bundle 144 is stitched with yarn that is two-ply, textured polyester yarn along one of the elastic component positioning tapes 143 every 12 inches, sandwiching the fiber bundle 144 between the woven cable 146 and the positioning tape 143. This method of attachment protects the fiber bundle 144. The cable 146 is left unattached near both ends to allow it to transition into the woven fiber protection cable assemblies 114.

FIG. 15 shows a fiber-optic splice tray 108 and termination assembly 150 in their positions relative to the intermodule female bulkhead coupling 110, clevis 112, woven fiber protection cable assembly 114, and fiber transition segment 116 at the aft end 120 of a module 102. A similar configuration exists at the forward end 106 of a module 102.

Figure 16:
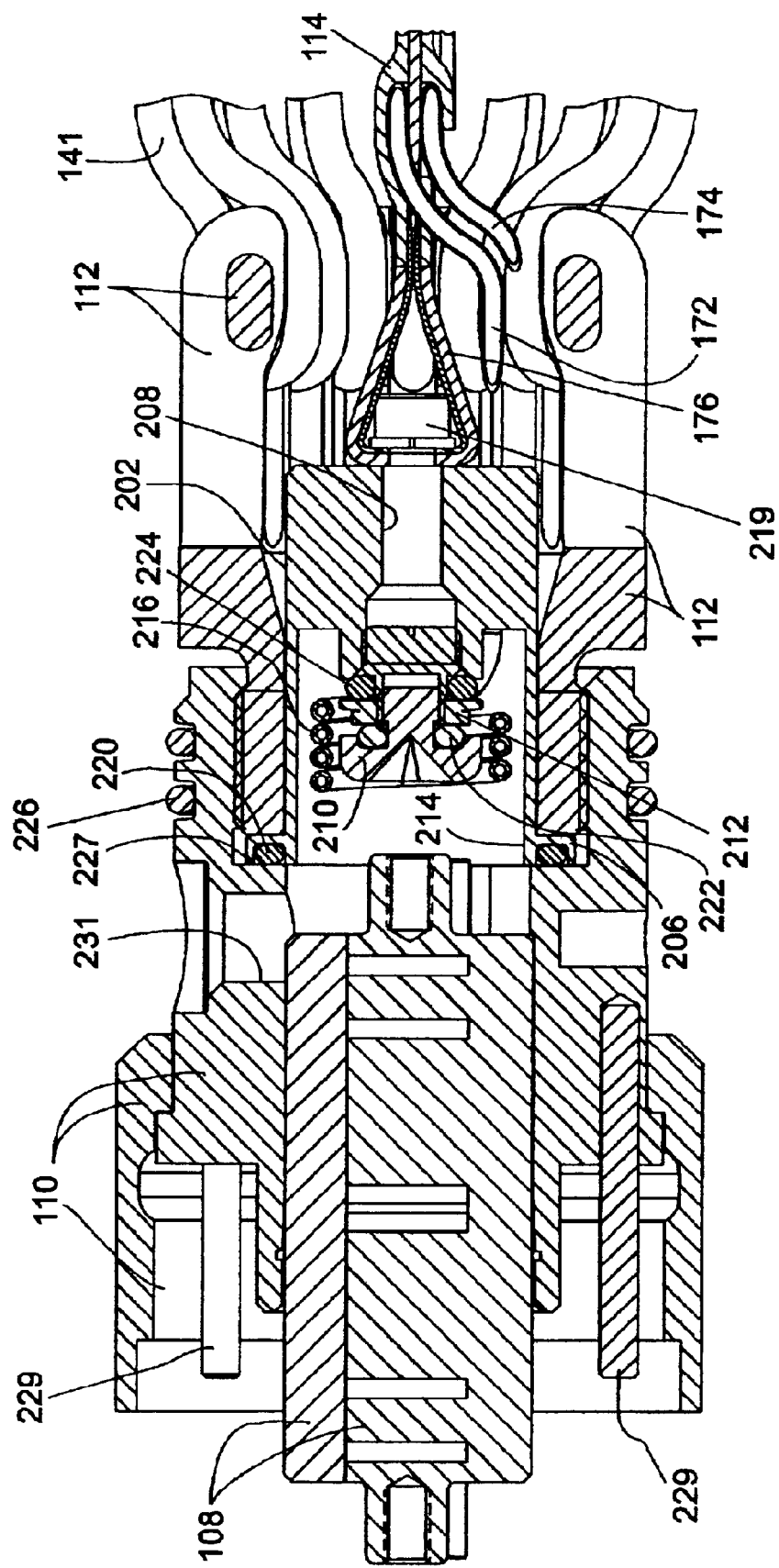
FIG. 16 is section view used in the description of a bulkhead coupling, fiber splice tray, termination assembly, and clevis of FIG. 15.
Figure 17:
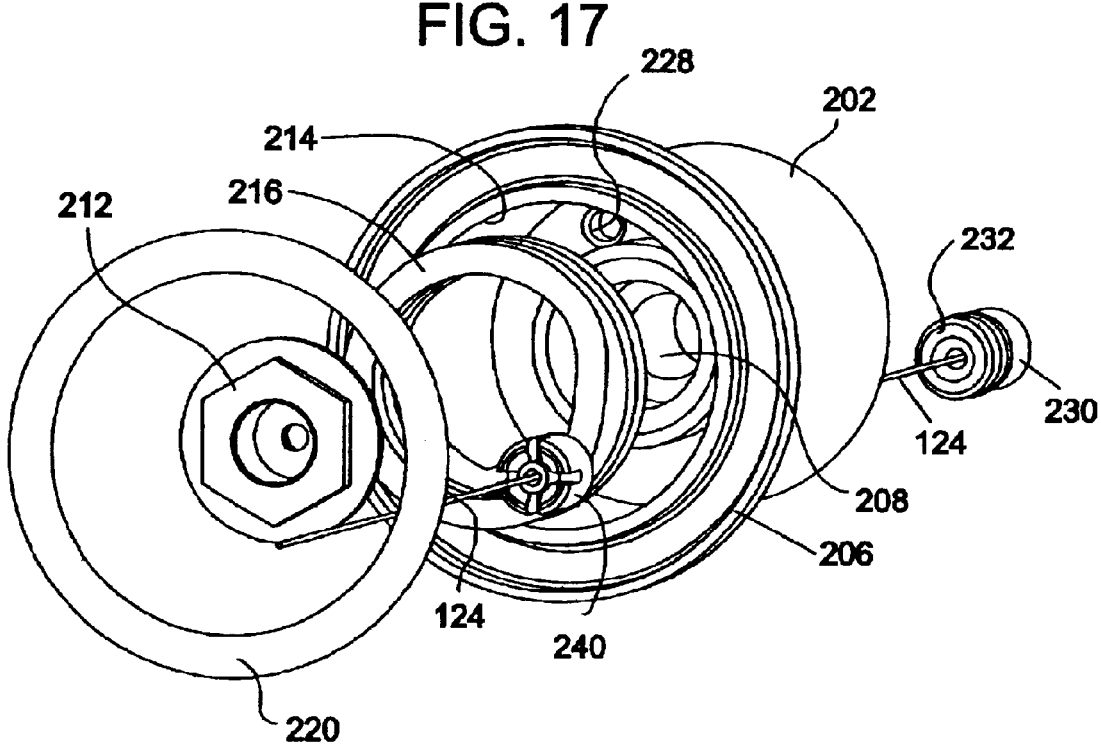
FIG. 17 is a perspective view of a termination assembly of the embodiment of FIG. 15.
Figure 18:
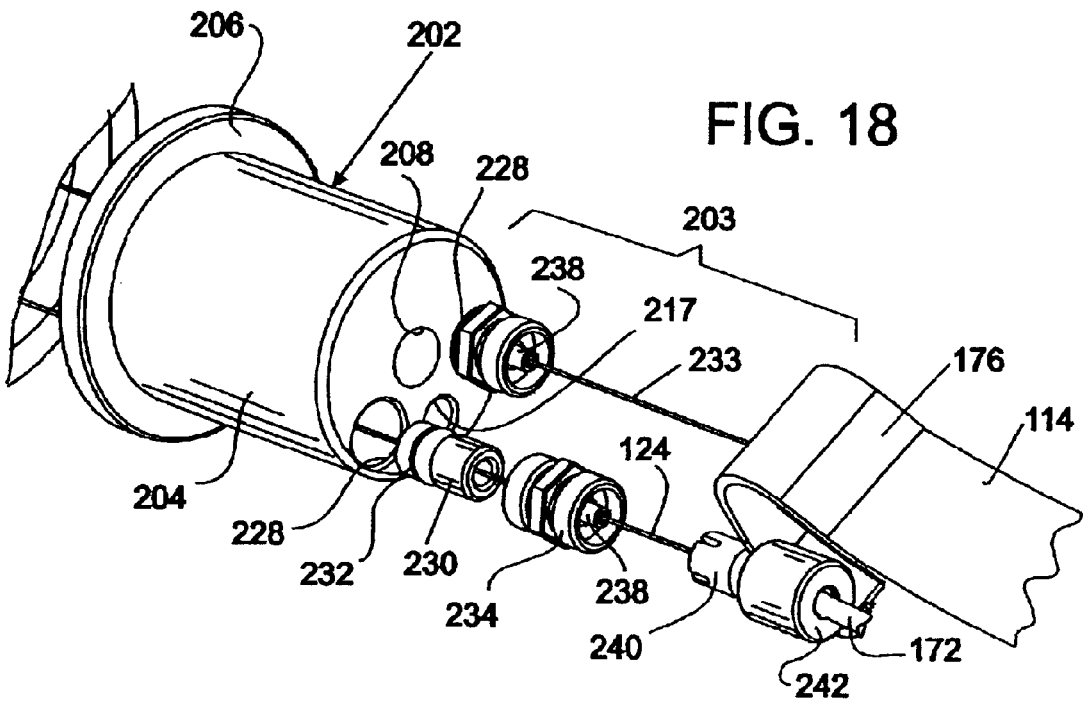
FIG. 18 is an enlarged exploded perspective view of an optical fiber seal of the embodiment of FIG. 15.

The termination assembly 150 comprises a module oil seal assembly 202 and a fiber seal assembly 203. The module oil seal assembly 202 is shown in FIGS. 16 through 18. The module oil seal assembly 202 is the primary hydrostatic seal for the module fill fluid, and comprises a cylinder 204 with one end open that has a circumferential ring 206 and the other end substantially closed. The module oil seal assembly 202 has a centrally located orifice 208 in the substantially closed end of the cylinder that accepts a threaded check valve 212 and seal screw 210. The cavity 214 defined by the cylinder 204 also accommodates a self-retracting coiled tube 216. The module oil seal assembly 202 also provides a threaded termination point 217 for the adjacent end of the woven fiber protection cable assembly 114, using a fastener such as a machine screw 219. O-rings 220, 222, 224 provide seals between mating parts. O-rings 226 on the outside of the bulkhead coupling 110 provide a seal between the bulkhead coupling 110 and the hose (not shown).

The female bulkhead coupling 110 has alignment pins 229 (two of three are shown) to facilitate mating with an adjacent male coupling 121 (FIG. 2). A port 231 for an additional threaded check valve assembly is also provided.

A static seal is formed at the interface of the intermodule bulkhead coupling 110 and clevis 112 by threading the coupling 110 onto the clevis 112, which compresses the O-ring 220 between the module oil seal ring 206 and the internal face of the coupling 227, and also mechanically restrains the module oil seal assembly in position. Sealant may be used as an alternative to an O-ring as known by one of ordinary skill in the art. The module oil seal assembly 202 also provides two identical counter-bored cavities 228 with O-ring sealing surfaces, which accept optical fiber seals 230 equipped with radial O-rings 232 for static sealing. The walls of the counter-bored holes 228 are machined to be radial sealing surfaces for the O-rings 232.The threaded check valve 212 permits the injection or removal of module fill fluid on an individual module basis. Both sensing and bypass optical fibers reside in the self-retracting coiled tube 216, which when mated to the fiber splice tray 108 provides means for managing the excess optical fiber service length required for accessing the fibers within the fiber splice tray 108. Extension and retraction of the coiled tube 216 can be accomplished without imparting strain on the optical fibers. The formed, self-retracting coiled tube 216 maintains a constant radius for the fibers residing within, thus preventing damage resulting from violations of the fibers" minimum bend radius.

Figure 19:
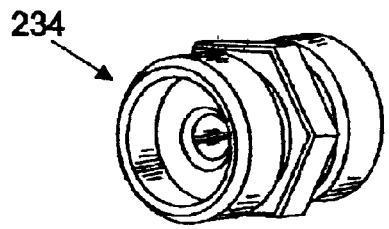
FIG. 19 is a perspective view of a fiber seal retainer of the embodiment of FIGS. 18.
Figure 20:
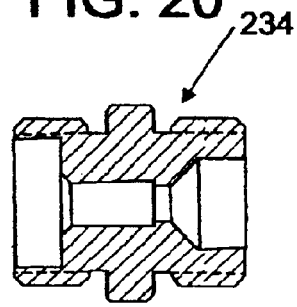
FIG. 20 is a longitudinal section view of the fiber seal retainer of FIG. 19.
Figure 21:
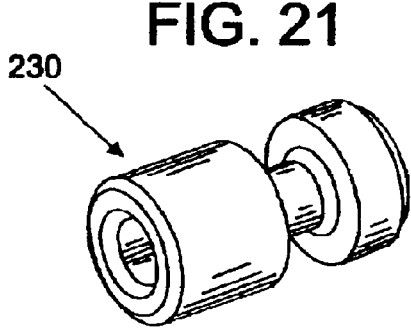
FIG. 21 is a perspective view of the fiber seal of the embodiment of FIG. 18.
Figure 22:
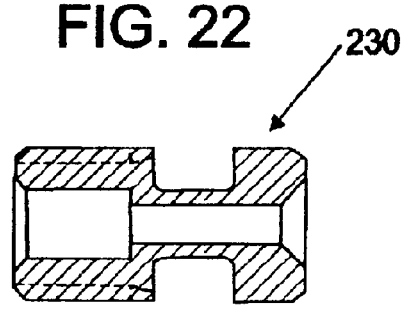
FIG. 22 is a longitudinal section view of the fiber seal of FIG. 21.
Figure 23:
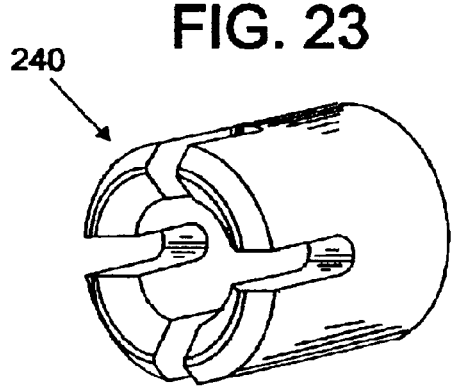
FIG. 23 is a perspective view of a compressive tube stop of the embodiment of FIGS. 17 and 18.
Figure 24:
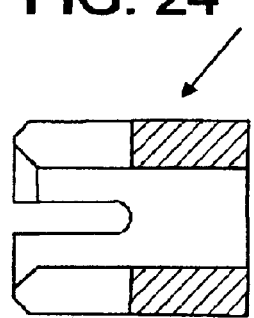
FIG. 24 is a longitudinal section view of the compressive tube stop of the embodiment of FIG. 23.
Figure 25:
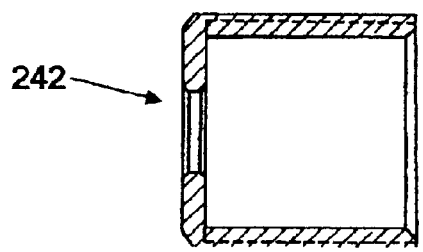
FIG. 25 is a longitudinal section view of an end cap of the embodiment of FIG. 18.
Figure 26:
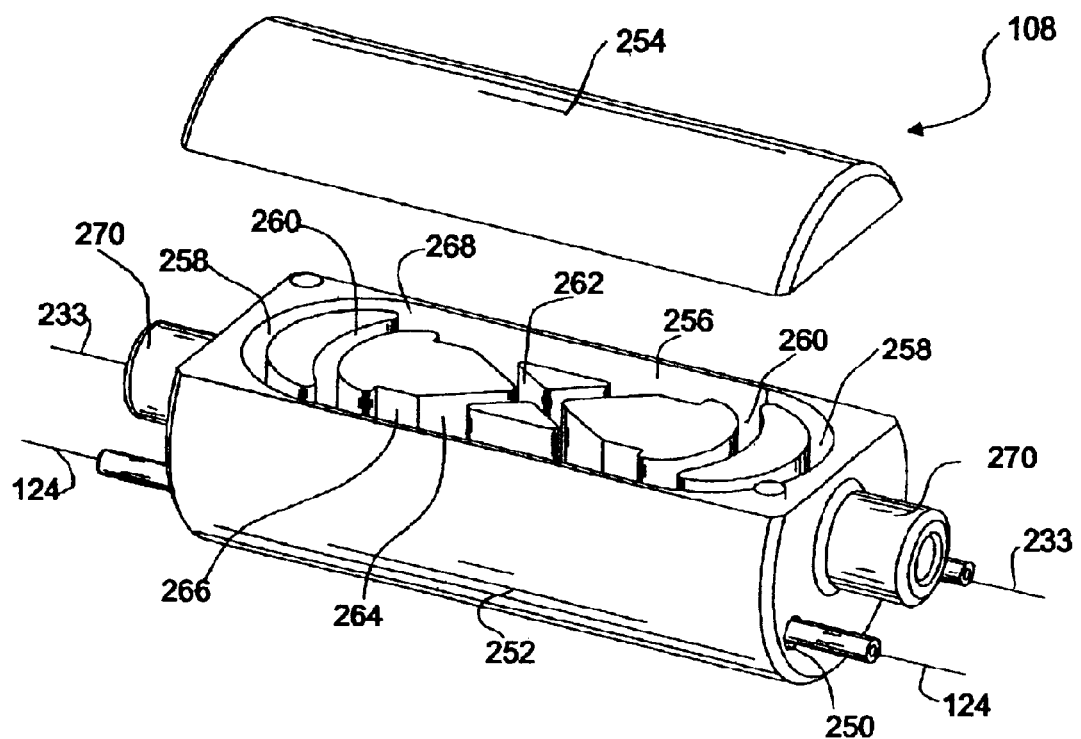
FIG. 26 is a perspective view of the fiber-optic splice tray of the embodiment of FIG. 15.
Figure 30:
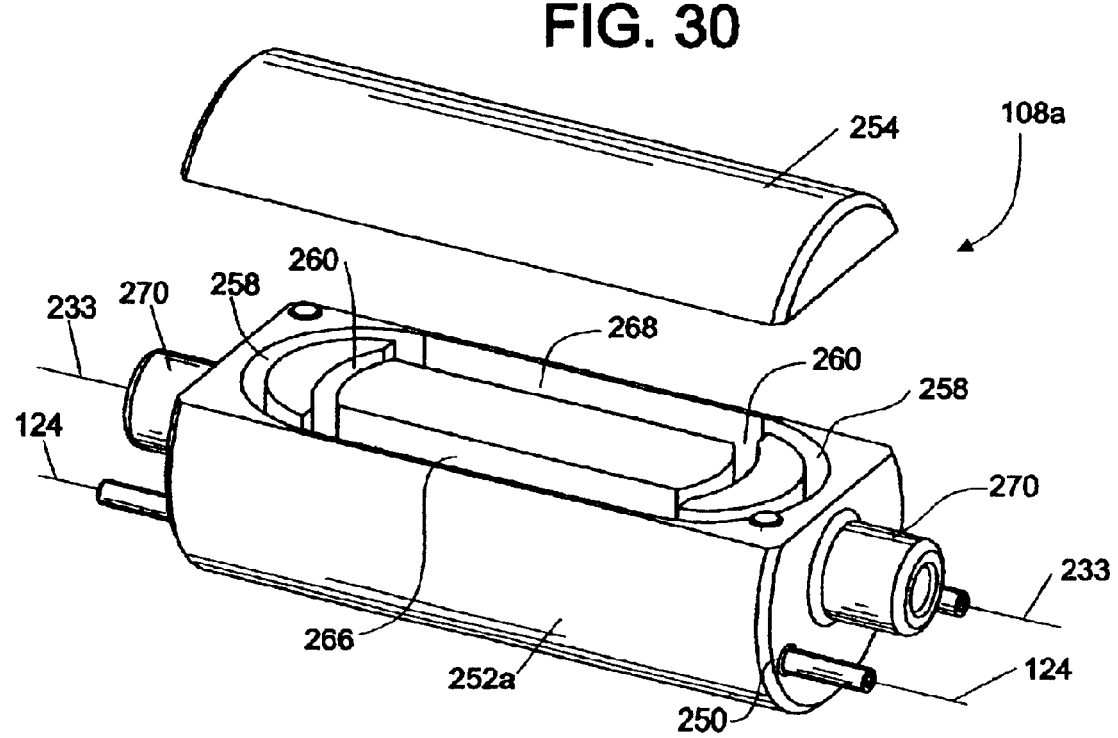
FIG. 30 is a perspective view of another embodiment of the fiber-optic splice tray of FIG. 15.
Figure 27:
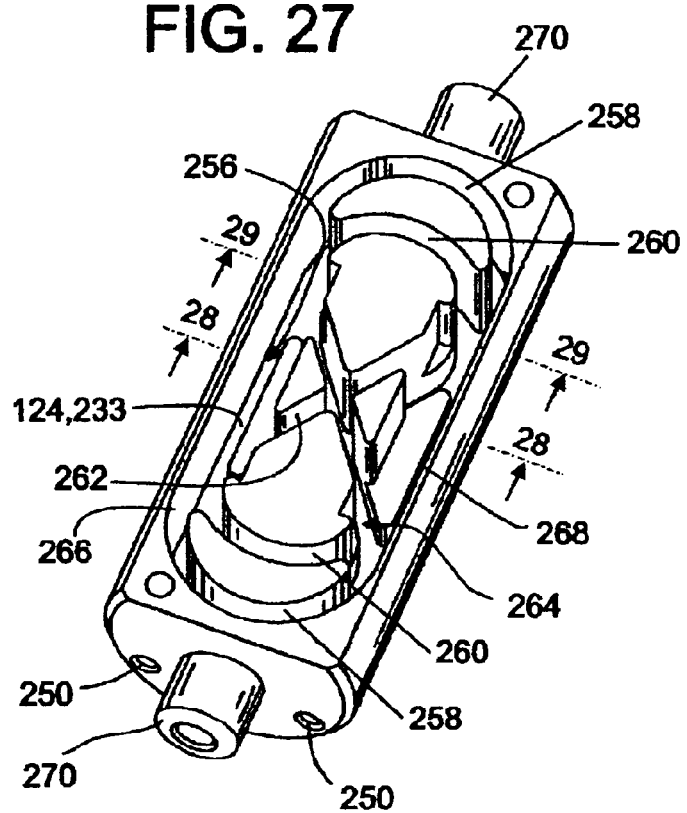
FIG. 27 is another perspective view of the fiber-optic splice tray of the embodiment of FIG. 15.
Figure 28:
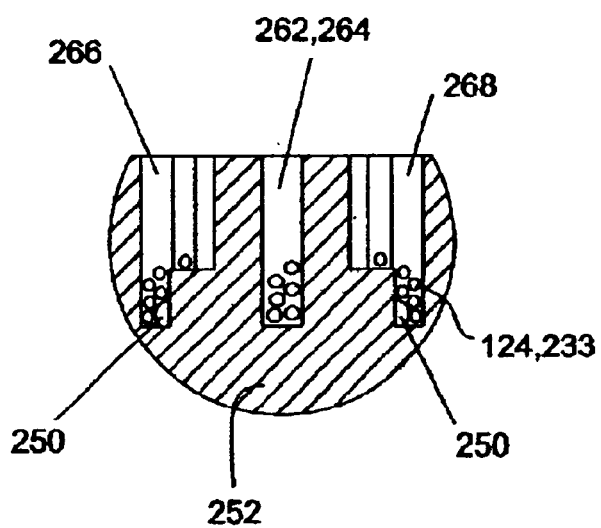
FIG. 28 is a cross-section view of the fiber-optic splice tray taken along line 2828 of FIG. 27.
Figure 29:
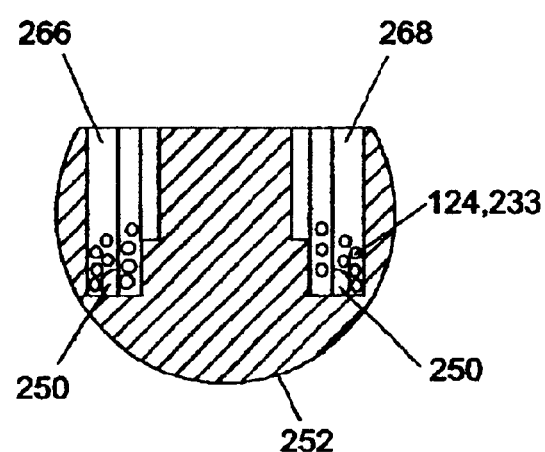
FIG. 29 is another cross-section view of the fiber-optic splice tray taken along line 2929 of FIG. 27.
Figure 31:
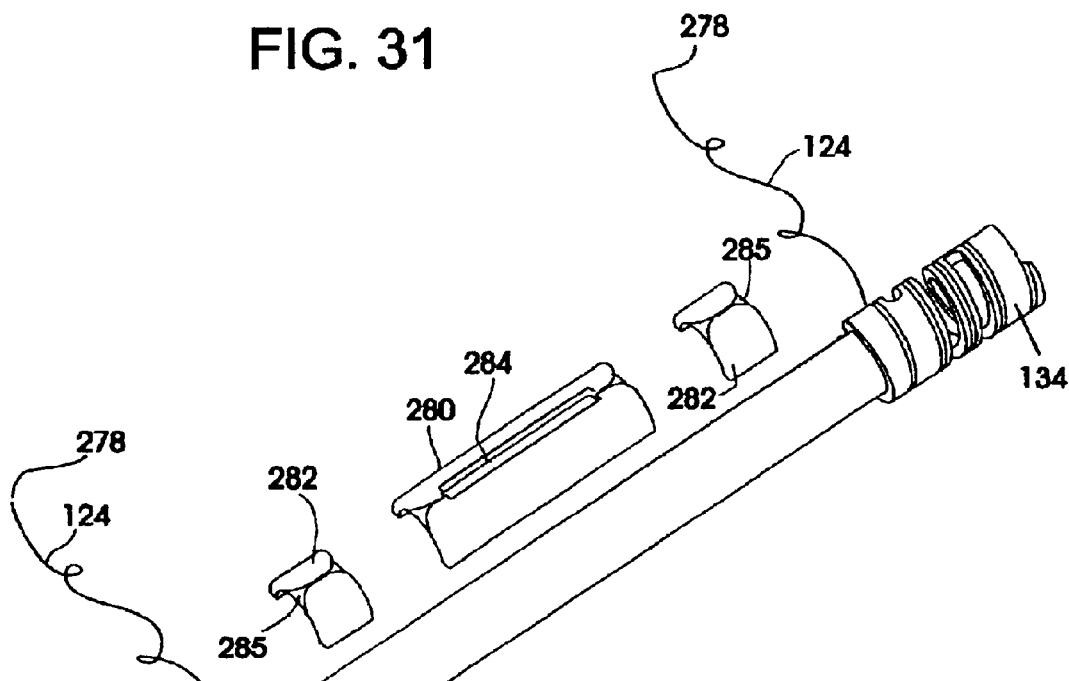
FIG. 31 is a partially exploded perspective view of an optical fiber splicing apparatus of the present invention and a hydrophone mandrel.

The module oil seal design accommodates the optical fiber seal assembly 203, shown together in FIG. 18. Bare optical fibers 124, 233 pass through a fiber seal retainer 234 (FIGS. 19 and 20) and the fiber seal 230 (FIGS. 21 and 22). The inner cavity of the fiber seal 230 is then back filled with an epoxy potting compound, which is compatible with the module fill fluid. The potting compound forms a reliable hydrostatic seal between the fibers 124, 233 and the metallic casing of the seal 230. A radial O-ring 232 is installed onto the fiber seal 230 and the potted seal is inserted into the counter-bored cavity 228 of the module oil seal cylinder 204. The fiber seal retainer 234 is threaded into the module seal cylinder 204 in order to secure the fiber seal 230 in place. The etched PTFE tubes 172, 174 (only 172 is shown) extending from the woven fiber protection cable assembly 114 are installed over tubes 238 in the fiber seal retainer 234 and secured with the compressive tube stops 240 (only one shown in FIG. 18; FIGS. 23 and 24). Retainer caps 242 (FIG. 25) are threaded over the tube stops 240 onto the fiber seal retainer 234 to ensure that the PTFE tubes 172, 174 are securely held in place. After this procedure has been completed, the coupling 110 is threaded onto the clevis 112 forming the module seal as described above. This establishes a reliable hydrostatic seal, which in one fabricated embodiment was demonstrated to withstand pressures in excess of 3,000 psi.

The termination assembly 202 is a protected means for providing hydrostatic module and optical fiber seals at the forward and aft bulkhead couplings 110 (aft bulkhead coupling is not shown) within a module 102. They also provide the capability to inject fill fluid to or remove fill fluid from each discrete module 102 prior to integration into a full towed acoustic array module string. These attributes are a prerequisite for making each module 102 a stand-alone entity that can be fabricated, optically tested and oil filled for neutral buoyancy. The incorporation of these components into the overall system design permits interchangeability between and within towed sonar acoustic arrays.

The integrity of the optical fiber is maintained (i.e., no induced strain or violation of minimum bend radius) within the seal assembly due to the fact that the fiber is fully protected over its entire transition length through the seal. The self-retracting coiled tube 216 located within the module seal cylinder 204 provides a controlled method of transitioning the optical fibers from the fiber seal assembly 203 to the fiber splice tray 108. The coiled tube 216 also provides flexibility (i.e. service length) to permit the removal and re-insertion of the fiber tray 108 to support the requirements of module interchangeability and array re-configuration.

The miniature fiber-optic splice tray assembly 108 for use in a hydrophone module 102 according to the present invention is shown in FIGS. 26 to 30. The fiber splice tray 108 houses spliced fibers at the connection between modules 102. The fiber tray 108 has both entry and exit points 250 for the fiber at either end of the tray 108. Two pairs of entry and exit points 250 are provided in the event that one pair is inadequate to accommodate the fibers in use. The bottom section 252 of the tray 108 mates with the top section 254, and an internal groove 256 in the bottom section is of sufficient depth to accommodate several meters of fiber in order to provide adequate service length for performing fusion splices during initial assembly or subsequent repair operations.

Each splice is surrounded by a rigid fusion splice sleeve that acts as a splint to protect the fiber at and adjacent to the splice. The rigid sleeve bends very little, and because of the miniature size of the tray, cannot accommodate the tight radii of the bends in the internal groove 256. Therefore, the sleeve must be located within a straight section of the internal groove 256. A means of manipulating the rigid fusion splice sleeve to a position within the straight sections is required. The internal groove 256 is designed with multiple alternative fiber paths. In one embodiment, shown in FIGS. 26 through 29, the fiber tray 108 has two alternative paths 258, 260 at each end of the tray 108 and has an additional two paths 262, 264 that cross in the middle of the tray as alternatives to the two parallel straight sections 266, 268. In another embodiment shown in FIG. 30, the tray 108a bottom section 252a has only two alternative paths at each end 258, 260. The fiber may be wound within the groove 256 (not shown), selecting the paths as required to place the sleeve in a straight section 266, 268 of the groove 256. The mating top 254 for the tray 108, 108a ensures that the fiber is totally encapsulated or captured for further protection during any assembly or repair operation. The tray 108,108a may be fabricated from, for example, ASTM A276 stainless steel rod, and has a diameter of between 0.608 and 0.612 inches. The radii of the arcs at each end may be on the order of 0.3 inches or less.

An advantage of the fiber-optic splice tray 108, 108a is that it can house fusion-spliced fibers, protective splice sleeves, and excess fiber service length in a small physical space envelope. The tray 108, 108a provides access to the optical fibers as they transition between modules 102 and serves as a protective housing for those components. The miniature splice tray 108, 108a accomplishes this within the bore of the thin-line towed sonar array intermodule coupling, thus providing an effective means of enabling and managing fusion-spliced fibers within a tightly confined volume. The small size of the splice tray 108, 108a is compatible with the physical geometry of existing towed array mechanical connectors and thus maintains commonality with existing handling system requirements, notably overall rigid length. A threaded boss 270 is provided at each end of the tray 108, 108a and is used as a temporary attachment point for a housing/booting fixture to maintain the splice tray in a fixed relative position during hosing of the module 102. The threaded boss 270 can also accept a plunger that opens the check valve 212 when the tray 108, 108a is inserted into the bulkhead coupling during mating of hydrophone modules 102.

An apparatus to allow splicing of a fiber across a mandrel is depicted in FIGS. 31 through 38. Short optical end terminations, referred to as fiber pigtails 278, remain after transitioning active sensing hydrophone fiber 124 into and through the intermodule mechanical connector 104. These fiber ends 278 must be spliced to the active sensing fiber 124 of the hydrophone assembly 118. The fiber splicing assembly comprises a mandrel body 136, a splice protector 280, a splinted fusion splice sleeve 281, and rotation sleeves 282. The splice sleeve is utilized to protect the fiber splice from the optical hydrophone assembly 118 and the woven fiber protection cable assembly 114. The splice sleeve may be polyvinylidene flouride (PVDF) heat shrinkable tubing with an interior coating of thermoplastic adhesive that is reinforced with a brass rod that minimizes bending. In one embodiment, the splice sleeve is approximately 0.9-long and is slid over the fiber just prior to making the splice. The splice protector 280 provides a recessed cavity 284 for supporting and protecting the splinted fusion splice sleeve. The rotation sleeves 282 facilitate the winding of excess fiber required for the fusion splicing operation down onto the mandrel body 136.

The fiber splice components 280, 282 are typically installed after the woven fiber protection cable assemblies 114 are secured in the module 102. The fiber pigtails 278 from the woven fiber protection cable assemblies 114 are fusion spliced with fiber pigtails 278 from the hydrophone assembly 118. The splice protector 280 is then bonded to the last hydrophone mandrel at each end of the hydrophone assembly 118. The splinted protection sleeve is installed and shrunk with the application of heat over the splice and then secured within the recessed cavity 284 on the splice protector 280. The two rotation sleeves 282 are utilized to wind the excess service length of the fiber down onto the hydrophone mandrel 136 on both sides of the splice protector 280, and the fiber is placed in the groove 285 in the rotation sleeves. The rotation sleeves 282 are then bonded in place. Although the rotation sleeves are shown aligned with the splice protector 280 and with each other in FIG. 32, this may not necessarily be the case. The orientation of each rotation sleeve 282 on the mandrel 136 is determined by the length of the sensing fiber 124 on the respective side of the splice protector 280.

This splicing apparatus and methodology facilitate fusion splice techniques within an optical hydrophone assembly. The new fiber splice apparatus and method provide the capability to cost effectively fabricate sub-components of hydrophone assemblies off-line for later integration into a towed array optical module subassembly. The present invention also provides repair capability in the event of a fiber break during fabrication of the optical hydrophone assembly. The splice components allow control of the placement, as well as protection of, the fusion splice sleeve on the optical hydrophone mandrel. The fiber splice of the present invention provides a controlled geometry that allows safe handling and permanent protection of the optical fiber.

There is a reduction in risk of fiber breakage resulting from having to transition the active sensing fiber from the hydrophone assembly into and through the module bulkhead couplings. The splicing technique of the present invention provides the capability to transition an autonomous fiber, which has been integrated into the optical end termination assembly off-line, into and through the module bulkhead couplings. This embodiment of the invention eliminates the potential of sacrificing an entire hydrophone assembly due to one fiber break during the fabrication of the module subassembly. Another major attribute is the ability to reside within the existing physical envelope of optical hydrophone assemblies with minimal impact to the overall sensitivity of the system, enabling intermodule connectivity using low loss optical fiber fusion splicing techniques.

Figure 39:
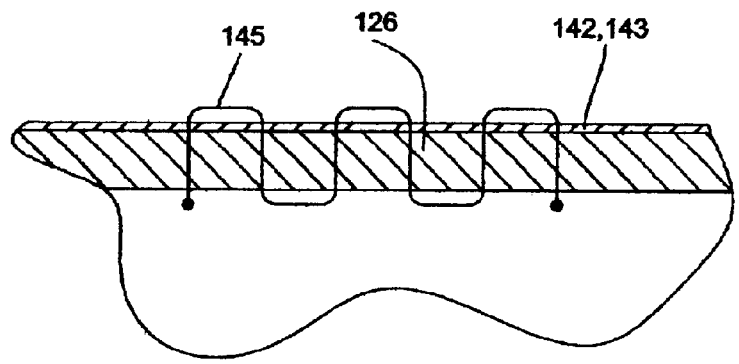
FIG. 39 is a partial longitudinal section view of the fastening of open cell foam to a positioning tape of the embodiment of the present invention in FIG. 2.

The fabrication process of one embodiment of a module begins with the assembly of the hydrophone 118. The mandrels 136, plugs 140, and interconnect springs 134 are assembled, and the optical sensing fiber 124 is wound on these components (FIGS. 2–6). The steel cage halves 130, 132 are added. A 0.5-inch wide woven polyester tape 137 is wrapped around and adhesively bonded to the steel cage 130, 132 and through periodically spaced pairs of slots 131 (FIG. 13). Utilizing 1.5-inch wide strips of polyester cloth, to which a thermoplastic adhesive is applied, individual foam sections four feet in length are joined together to form a continuous length of hollow open pore foam 126. Before the foam assembly 126 is installed, the internal strength member 141 (ISM) along with positioning tapes 142, 143 are placed under an initial tension to insure that its length is equivalent to the nominal hose length. Then the foam assembly 126 is installed. Next, at the center of the ISM 141, the foam assembly 126 is secured to both of the internal positioning tapes 142, 143 every 18 inches using polyester thread 145 as depicted in FIG. 39 (only one side of the foam and one positioning tape shown). The entire length of the stitching is between 1.2 and 1.5 inches.

Figure 40:
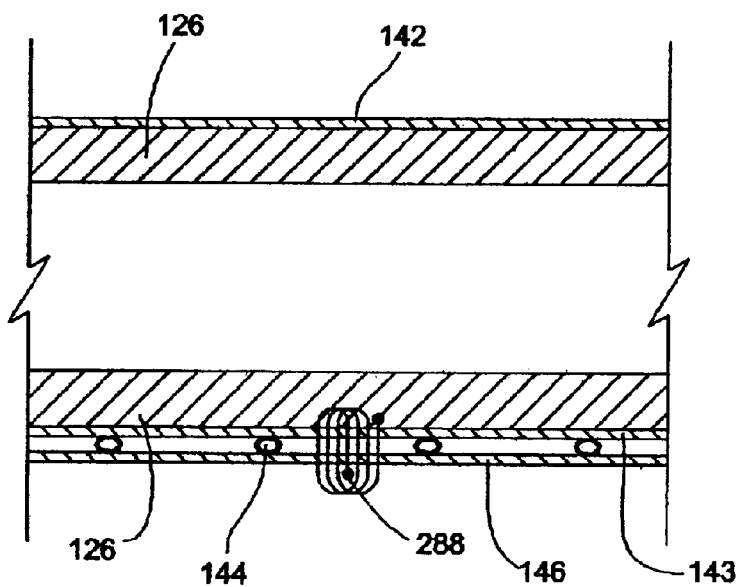
FIG. 40 is a partial longitudinal section of the fastening of a bypass cable assembly to a positioning tape of the embodiment of the present invention in FIG. 2.

The next step in the fabrication process is the installation of the bypass cable assembly 200 that comprises the jacketed bypass fibers 144 and woven fiber bypass cable 146. The bypass cable 146 is stitched every 12 inches along the positioning tape 143, as depicted in FIG. 40, so that the jacketed bypass fibers 144 are sandwiched between the woven cable 146 and the positioning tape 143. The stitching 288 is a loop stitch of polyester thread with two or three loops. This method of attachment provides increased protection for the fiber bundle. The cable is left unattached near both ends so that it may be transitioned into the fiber protection components.

The ISM 141 and its positioning tapes 142, 143 are then placed under additional tension in order to elongate it in preparation for the installation of the hydrophone assembly 118 and other components up to the devises 112. The length of the ISM 141 for the installation of the hydrophone assembly is based upon several factors: nominal hose length, hose elongation characteristics, number and design of interconnect springs.

Elongating the ISM prior to installation of the hydrophone assembly was found in testing a prototype to help optimize the interconnect spring gap spacings under operational tow speeds and during reeling. Adherence to this installation methodology allows full extension of the hydrophone assembly 118 during maximum elongation of the module 112, which occurs at peak tow speeds.

Figure 41:
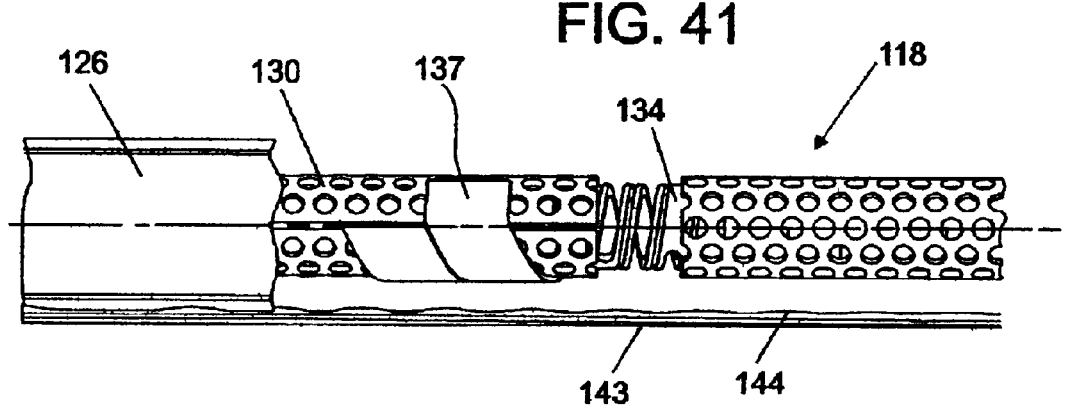
FIG. 41 is an elevation view of a hydrophone assembly of the present invention.

The hydrophone assembly 118 is attached to both positioning tapes 142, 143 by passing 0.5-inch wide woven polyester tape 137 (FIG. 41) through and around the slotted cage halves 130 and sewing the free ends to the tape 142, 143 through the foam 126. As previously noted, slotted cage halves may be placed at the forward, mid, and aftmost channels of the hydrophone assembly, or at any desired interval. This technique is used to provide a loosely coupled attachment system. In order to provide enhanced positional stability, each hydrophone 118 element is bonded to the open pore foam 126 using a thermoplastic adhesive. The adhesive bond is formed between the foam 126 and the 0.5-inch wide strip of woven polyester tape 137 that has been wrapped around and adhesive bonded to each set of cage halves 130.

The next step in the fabrication process is the integration of the fiber transition segment 116 with the woven fiber protection cable assembly 114 and the interconnect spring 134 in order to construct the fiber protection assembly for both the forward and aft ends of the module (FIGS. 7–12). This step may be performed at any time during fabrication since the intent is to fabricate this assembly off-line. The transition segment 116, which has an internal groove with the same pitch as an interconnect spring 134, is aligned with a spring 134 and solvent bonded. This attachment scheme is identical to the attachment method utilized for attaching the hydrophone mandrels 136 to the interconnect springs 134. The retractable coiled tube 172 extending from the woven fiber protection cable assembly 114 is wound into the grooves 190 of the transition segment 116 for two to three revolutions. The bare fiber exiting from within the tube continues along the helical groove 190 for two to three additional revolutions. Both the bare fiber and etched PTFE tube 172 are secured within the groove 190 with ultraviolet curable optical adhesive such as Norland NOA UV curable adhesive available from Norland Products, Inc. of New Brunswick, New Jersey. The helical winding of the optical fiber is continued as it transitions off of the transition segment 116 and onto the interconnect spring 134. A service length of optical fiber is maintained (approximately one meter) in order to allow future fusion splicing of the optical fiber to the optical fiber on the hydrophone assembly 118.

The woven fiber protection cable assembly 114 is secured within the module 102 by stitching one of the two reinforced branches 178 of the woven cable 170 to the internal positioning tape 142 and the other branch 178 to the other positioning tape 143. The bypass fiber 144 is transitioned from the woven cable 146 to the woven fiber protection cable assembly 114 by maintaining its sinusoidal pattern along one of the branches 178 of the woven fiber protection cable 170. The jacketed fiber bundle 144 is then transitioned off of the woven fiber bypass cable branch 178 and may enter a separate protective carrier 174 (i.e., PTFE tubing) that is integrated within the woven fiber protection cable 170, or in the preferred embodiment the jacketed fiber bundle 144 is directly integrated into the woven fiber protection cable 170. The fiber protection cable 170 is then inserted through the clevis 112 and bulkhead 110. This design approach ensures the survivability of both the active hydrophone sensing fiber and bypass fibers in this critical area where they are transitioned to the central axis of the module 102. It also provides the desired characteristics for elongation and retraction.

Figure 32:
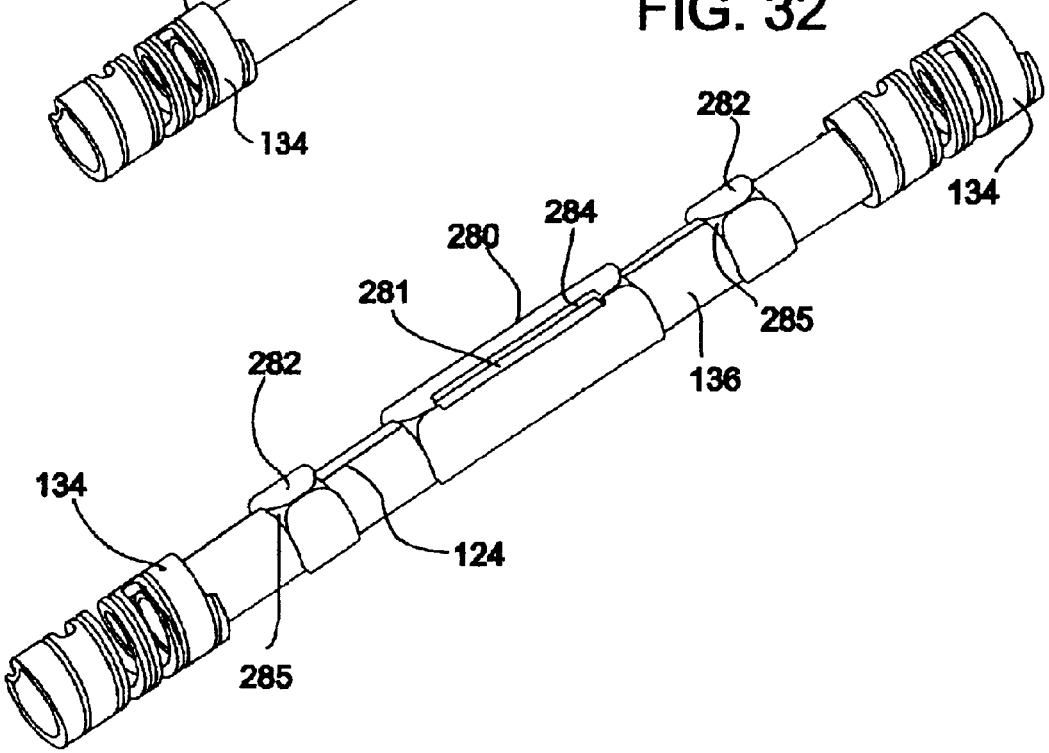
FIG. 32 is a perspective view of the optical fiber splicing apparatus of FIG. 31, installed on a hydrophone mandrel.
Figure 33:
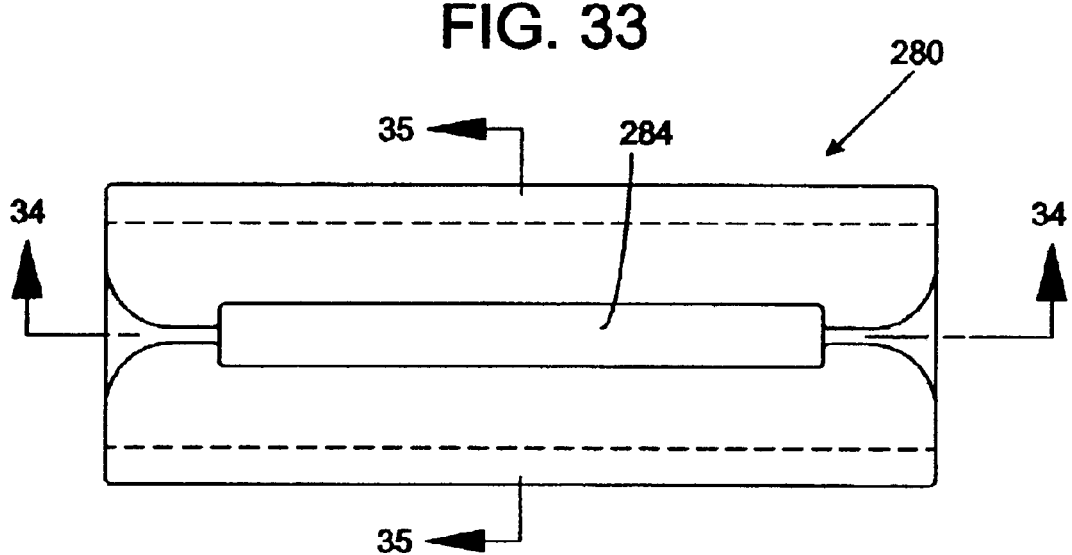
FIG. 33 is a plan view of the splice protector of the optical fiber splicing apparatus of FIG. 31.
Figure 34:
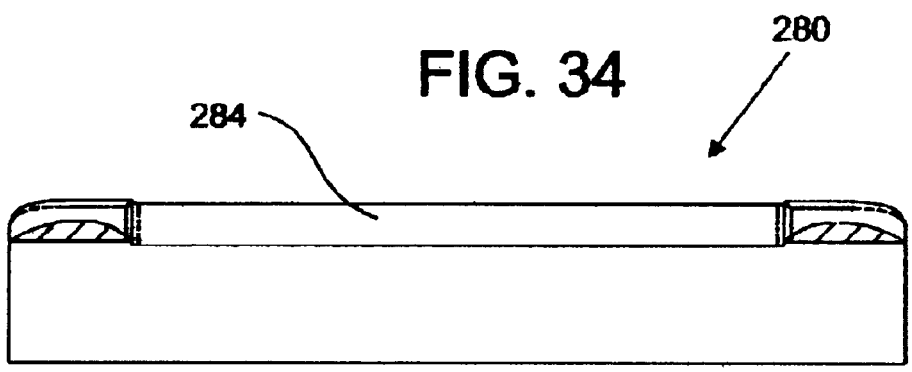
FIG. 34 is a longitudinal section view of the splice protector taken along line 3434 of FIG. 33.
Figure 35:
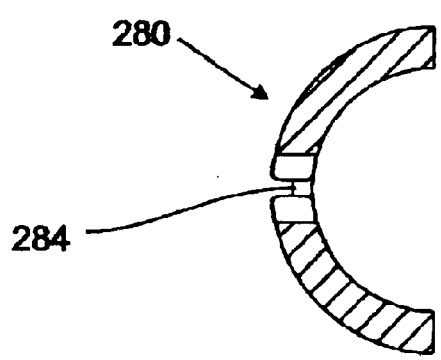
FIG. 35 is a cross-section view of the splice protector taken along line 3535 of FIG. 33.
Figure 36:
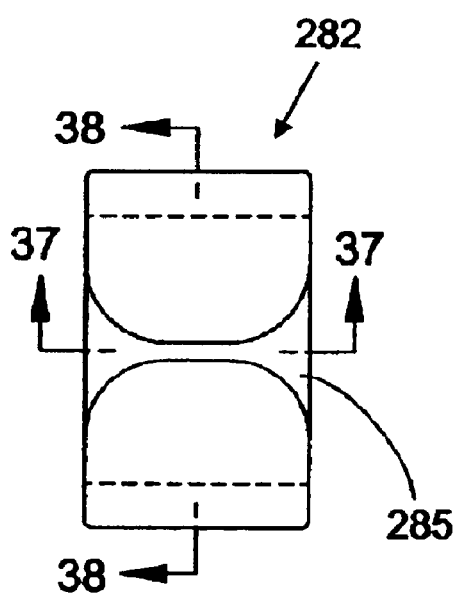
FIG. 36 is a plan view of a rotation sleeve of the optical fiber splicing apparatus of FIG. 31.
Figure 37:
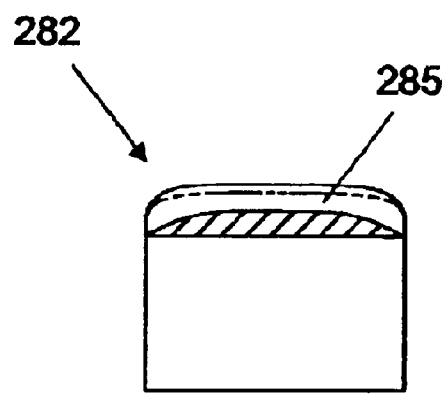
FIG. 37 is a longitudinal section view of the rotation sleeve taken along line 3737 of FIG. 36.
Figure 38:
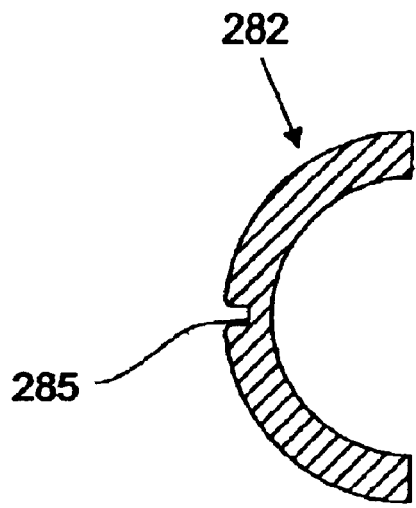
FIG. 38 is a cross-section view of the rotation sleeve taken along line 3838 of FIG. 36.

After the forward and aft woven fiber protection cable branches 178 are secured within the module 102, the fiber pigtails from the transition segments 116 are fusion spliced with the fiber pigtails of the hydrophone assembly 118. The splice protector 280 is bonded to the last hydrophone mandrel 136 at each end of the hydrophone assembly 118. A custom designed splinted protection sleeve is installed over the splice and then secured within the recessed cavity 284 on the splice protector 280. Two rotation sleeves 282 are utilized to wind the excess service length of fiber down onto the hydrophone mandrel 136 on both sides of the splice protector 280. The two rotation sleeves 282 are bonded in place resulting in the final configuration that is depicted in FIG. 32. This mandrel 136 is intentionally breached to allow it to free flood in order to make it acoustically insensitive. The cage halves 130 and 132 are then placed around the mandrel body 136 and bonded in place in the same manner as all other hydrophone mandrels.

The woven fiber protection cables assemblies 114 are attached to the module oil seal 202 as shown in FIGS. 15 and 16. The fiber protection is attached to the module oil seal 202 with a machine screw 219 and the tray 108 is coupled to the seal via the coiled tubing 216 through which the fibers transition. At this point the fibers (hydrophone and bypass) are transitioned out of the woven cable assembly 170 and into the tubes 238 of the fiber seal retainer 234, through the coiled tube 216 and into the fiber tray 108. The PTFE tubes 172, 174 for the fiber are terminated at the fiber seal 203 (FIG. 18). The woven fiber protection cable assembly 170 is attached to the module oil seal 202 with a fastener, preferably a machine screw 219 (FIG. 16) that ensures that all loads are carried by the woven cable with none being transferred to the protective carrier or fiber. A sufficient length of bare fiber is wound and stored into the internal groove 256 within the fiber tray 108 in order to provide the service length required for performing fusion splices for intermodule connectivity.

Figure 42:
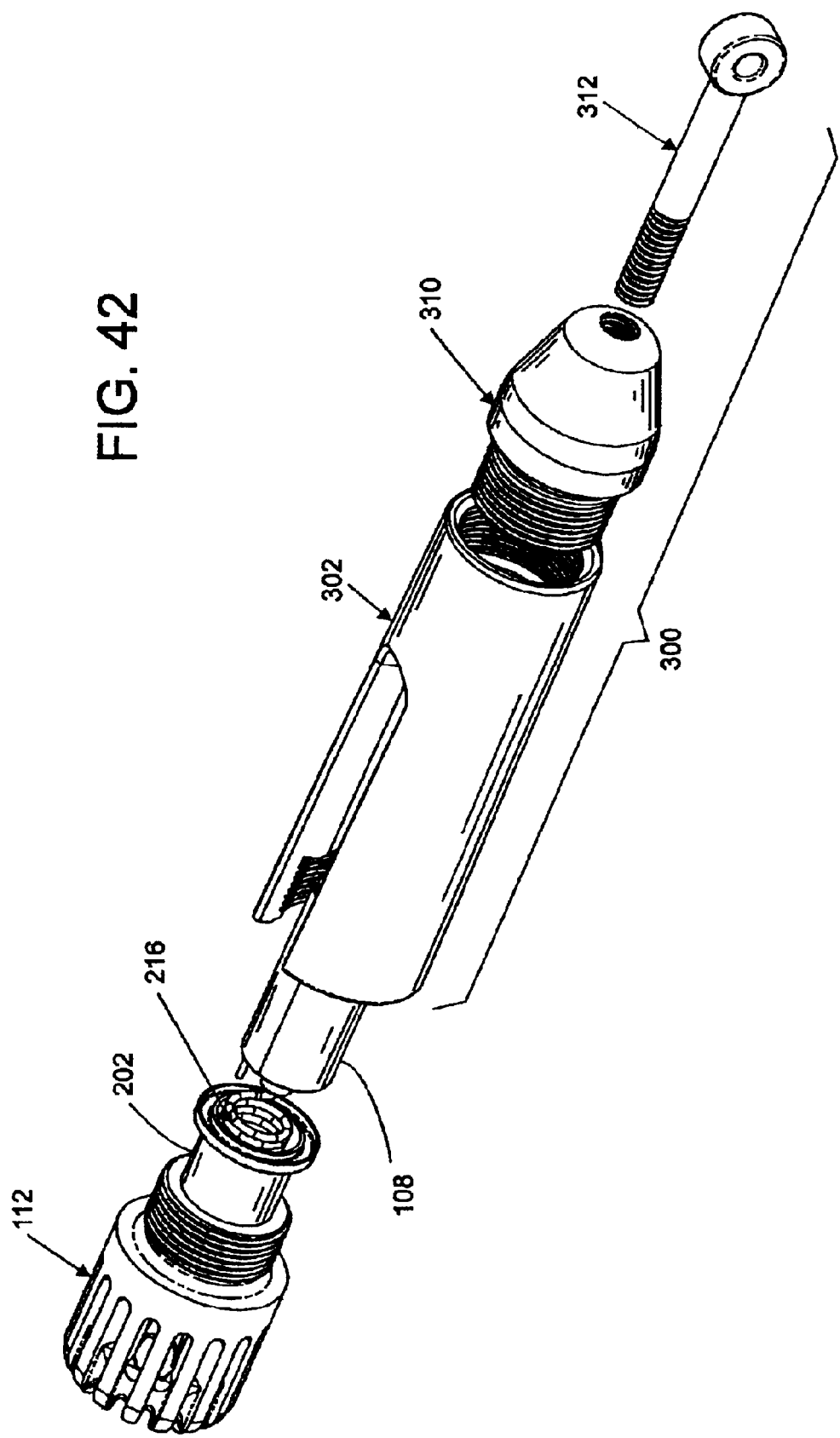
FIG. 42 is an exploded perspective view of a hose pulling assembly used to assemble the embodiment of FIG. 2.
Figure 43:
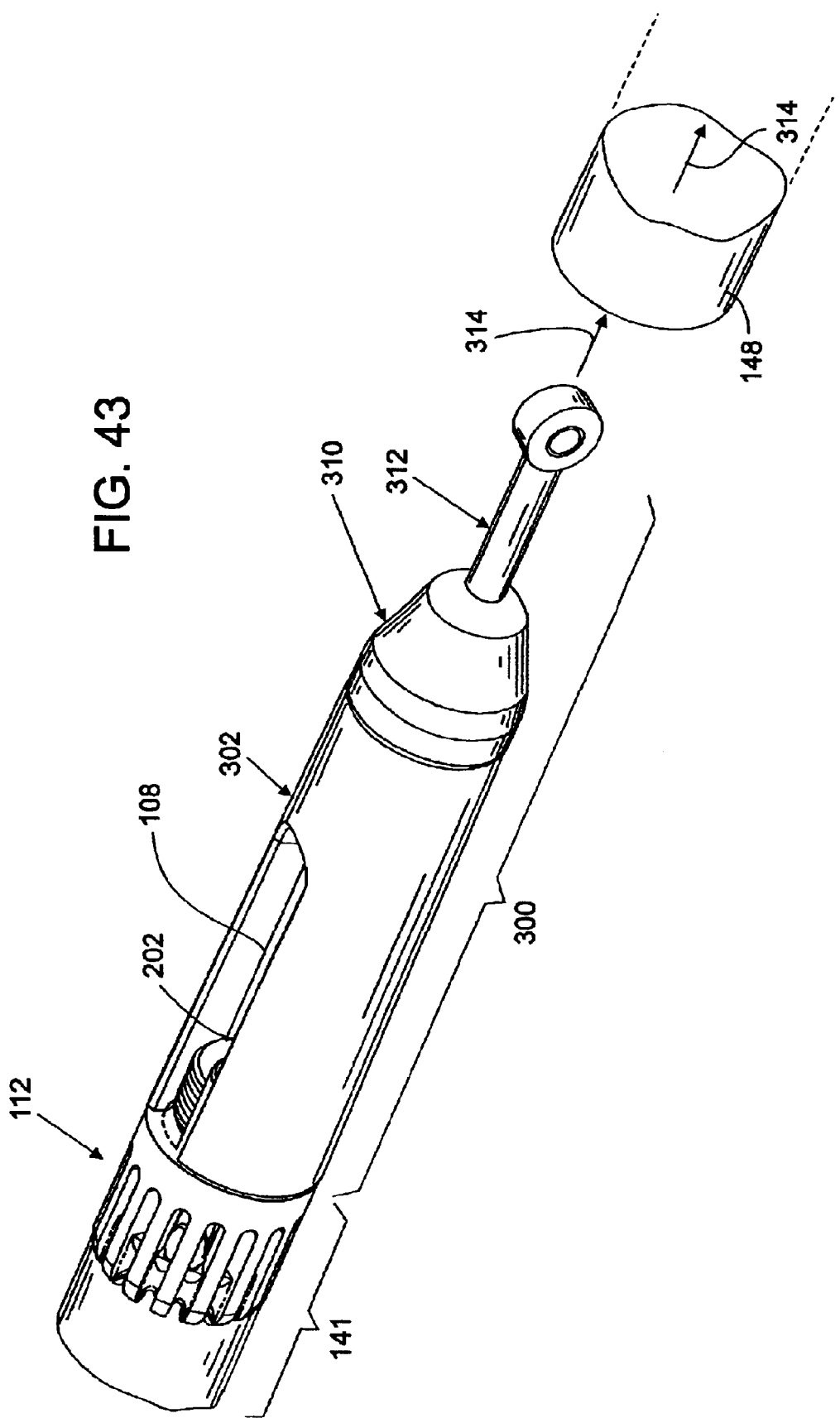
FIG. 43 is a perspective view of a hose pulling assembly used to assemble the embodiment of FIG. 2.

In order to accommodate the hosing process, where the hose is slid over the module 102, the forward end of the module 102 is terminated with a termination assembly 150, a fiber splice tray 108 and a forward bulkhead coupling 110. The aft end is terminated with a termination assembly 150, a temporary fiber splice tray 108, and temporary tooling. The aft end that is not fully terminated has temporary tooling installed on it until the hose is slid over the module. For hosing, the aft end of the ISM 141 must be pulled into and through the hose 148. Temporary tooling 300, shown in FIGS. 42 and 43, is designed to secure the aft fiber splice tray 108 and coiled tubing 216 within a protective enclosure 302 that is sized to fit within the hose. The temporary tooling 300 comprises the protective enclosure 302, a pulling adapter 310, and an eyebolt 312. The clevis 112 is part of the ISM 141 and has threads that mate with the protective enclosure 302. The protective enclosure houses the aft fiber splice tray 108, 108a and secures it to inhibit rotational or extensional movement during the hosing/booting process. The pulling adapter serves as an interface between the enclosure 302 and the eyebolt 312. It is tapered to accommodate a lead in for smooth entry into the hose. The eyebolt 312 provides for easy attachment to the wire rope that is used to pull 314 the module 102 into the hose 148.

A wire rope is passed through the hose and attached to a swivel and then the eyebolt 312 on temporary tooling 300 at the aft end of the ISM 141. The hose 148 is tensioned and the ISM 141, with the hydrophone assembly 118 installed, is pulled into the hose. The temporary tooling 300 is then removed and the remaining module 102 end component is installed, comprising the aft bulkhead coupling 110 as depicted in FIG. 15. The module 102 is then oil filled to complete the assembly process. The embodiments of the present invention protect the active sensing optical fiber and the bypass fiber from damage that could otherwise result in the normal course of towing and handling optical hydrophone sonar arrays. The effect of elongation and bending requirements imposed on the module are reduced on the optical fiber by the present invention embodiments, which result in a durable and reliable optical hydrophone sonar array. The embodiments of the present invention also facilitate the assembly of the arrays, in that modules may be individually constructed. Subassemblies within the module, such as the hydrophone assembly and the parts of the module from the fiber transition segment to the adjacent end of the module, may be fabricated independently and then combined.

Although the present invention has been shown and described in considerable detail with respect to only one exemplary embodiment for each component, it should be understood by those skilled in the art that we do not intend to limit the invention to the one embodiment since various modifications, omissions and additions may be made to the disclosed embodiment without materially departing from the novel teachings and advantages of the invention, particularly in light of the foregoing teachings. For example, the components may be of modified shapes and sizes. Accordingly, we intend to cover all such modifications, omission, additions and equivalents as may be included within the spirit and scope of the invention as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A module oil seal assembly for use in an optical fiber hydrophone module, the module comprising an optical hydrophone assembly, a woven fiber protection cable assembly proximate to an end of the hydrophone assembly, an intermodule bulkhead coupling, and a clevis mounted to the intermodule bulkhead coupling, the hydrophone assembly comprising a plurality of mandrels helically wrapped with optical fiber and connected in linear relation, the woven fiber protection cable assembly comprising an elastic woven strap with one looped end, the looped end of the woven fiber protection cable assembly disposed at least partially within the clevis and towards the bulkhead coupling, the module oil seal assembly comprising:

a module oil seal, having a cylindrical wall with one end substantially closed and the other end open, the wall defining a cavity, the open end having an annular face plate extending outwardly from the periphery of the wall, the face plate surface distal from the closed end of the module oil seal being a face seal;

one orifice through the substantially closed end of the module oil seal, the orifice adapted to receive a check valve;

an opening through the substantially closed end for receiving optical fibers;

means for sealing in proximate registration with the face seal; and wherein the module oil seal except for the face plate is reciprocally mounted within the clevis, and the face plate is reciprocally mounted within the bulkhead coupling such that the face seal abuts an adjacent surface of the coupling to make a seal.

2. A module oil seal assembly as recited in claim 1, further comprising a retractable coiled tube housed within the cavity, adapted to receive optical fibers from the opening through the substantially closed end of the module oil seal.

3. A module oil seal assembly as recited in claim 1, wherein the means for sealing comprises an O-ring.

4. A module oil seal assembly as recited in claim 3, wherein the connection between the clevis and the bulkhead coupling compresses the O-ring seal and mechanically restrains the module oil seal.

5. A module oil seal assembly as recited in claim 1, wherein the substantially closed end of the module oil seal is fastened to the looped end of the woven fiber protection cable assembly.

6. A module oil seal assembly as recited in claim 1, wherein the orifice adapted to receive a check valve is centrally located in the substantially closed end of the module oil seal.

7. A module oil seal assembly as recited in claim 1, further comprising a check valve disposed in the central orifice for filling and emptying the module with the module fill fluid.

8. An optical fiber seal assembly for sealing between a cylindrical opening and one or more optical fibers passing therethrough, and for use in an optical fiber hydrophone module, the module comprising an optical hydrophone assembly, a woven fiber protection cable assembly proximate to an end of the hydrophone assembly, a clevis, a module oil seal, and a clevis mounted to the intermodule bulkhead coupling, the hydrophone assembly comprising a plurality of mandrels helically wrapped with optical fiber and connected in linear relation, the woven fiber protection cable assembly comprising an elastic woven strap, the module oil seal having a substantially cylindrical wall that defines a cavity with one end open and the other end closed with at least one generally cylindrical opening through the substantially closed end for receiving optical fibers, the fiber seal assembly comprising:

a fiber seal adapted to be received in the module oil seal opening, the fiber seal having a substantially cylindrical wall defining a void for receiving bare optical fibers, the fiber seal having a first end and a second end, the first end disposed within the module oil seal, and having an O-ring around its periphery for forming a seal with the module oil seal opening;

potting compound within the fiber seal, for sealing between the optical fibers and the wall of the fiber seal;

a fiber seal retainer, having a first end and a second end, the first end being threaded into the module oil seal opening over the fiber seal;

a tube containing the optical fibers extending from the woven fiber protection cable assembly to the fiber seal retainer;

a compressive tube stop, having a substantially cylindrical wall defining a void adapted to receive the optical fiber tube, the tube stop having a first end and a second end, the tube stop first end reciprocally received in the fiber seal retainer second end, the tube stop first end having at least one slot across its first end diameter for allowing compression of the tube stop first end within the fiber seal retainer second end to a snug fit; and a retainer cap having a substantially cylindrical wall with one end open and the other end substantially closed, with at least one orifice through the substantially closed end for receiving optical fibers, the retainer cap open end being threaded over the fiber seal retainer second end.

9. A module oil seal assembly for use in an optical fiber hydrophone module, the module comprising an optical hydrophone assembly, a woven fiber protection cable assembly proximate to an end of the hydrophone assembly, and a clevis mounted to the intermodule bulkhead coupling, the hydrophone assembly comprising a plurality of mandrels helically wrapped with optical fiber and connected in linear relation, the woven fiber protection cable assembly comprising an elastic woven strap with one looped end, the looped end of the woven fiber protection cable assembly disposed at least partially within the clevis and towards the bulkhead coupling, the module oil seal assembly comprising:

a module oil seal, having a cylindrical wall with one end substantially closed and the other end open, the wall defining a cavity, the open end having an annular face plate extending outwardly from the periphery of the wall, the face plate surface distal from the closed end of the module oil seal being a face seal;

one orifice through the substantially closed end of the module oil seal, the orifice adapted to receive a check valve;

an opening through the substantially closed end for receiving optical fibers;

an O-ring in proximate registration with the face seal;

a fiber seal adapted to be received in the module oil seal opening, the fiber seal having a substantially cylindrical wall defining a void for receiving bare optical fibers, the fiber seal having a first end and a second end, the first end disposed within the module oil seal, and having an O-ring around its periphery for forming a seal with the module oil seal opening;

potting compound within the fiber seal, for sealing between the optical fibers and the wall of the fiber seal;

a fiber seal retainer, having a first end and a second end, the first end being threaded into the module oil seal opening over the fiber seal;

a tube containing the optical fibers extending from the woven fiber protection cable assembly to the fiber seal retainer;

a compressive tube stop, having a substantially cylindrical wall defining a void adapted to receive the optical fiber tube, the tube stop having a first end and a second end, the tube stop first end reciprocally received in the fiber seal retainer second end, the tube stop first end having at least one slot across its first end diameter for allowing compression of the tube stop first end within the fiber seal retainer second end to a snug fit; and a retainer cap having a substantially cylindrical wall with one end open and the other end substantially closed, with at least one orifice through the substantially closed end for receiving optical fibers, the retainer cap open end being threaded over the fiber seal retainer second end;

wherein the module oil seal except for the face plate is reciprocally mounted within the clevis, and the face plate is reciprocally mounted within the bulkhead coupling such that the face seal abuts an adjacent surface of the coupling to make a seal.

10. A module oil seal assembly as recited in claim 9, further comprising a retractable coiled tube housed within the cavity of the module oil seal, adapted to receive optical fibers from the opening through the substantially closed end of the module oil seal.

11. A module oil seal assembly as recited in claim 9, wherein the connection between the clevis and the bulkhead coupling compresses the O-ring seal and mechanically restrains the module oil seal.

12. A module oil seal assembly as recited in claim 9, wherein the substantially closed end of the module oil seal is fastened to the looped end of the woven fiber protection cable assembly.

13. A module oil seal assembly as recited in claim 9, wherein the orifice adapted to receive a check valve is centrally located in the substantially closed end of the module oil seal.

14. A module oil seal assembly as recited in claim 13, further comprising a check valve disposed in the central orifice for filling and emptying the module with the module fill fluid.

15. An optical fiber hydrophone module comprising:

an optical hydrophone assembly comprising a plurality of mandrels helically wrapped with optical fiber and connected in linear relation;

a woven fiber protection cable assembly proximate to an end of the hydrophone assembly and comprising an elastic woven strap with one looped end, the looped end of the woven fiber protection cable assembly disposed at least partially within the clevis towards the bulkhead coupling an intermodule bulkhead coupling at the end of the module;

a clevis mounted to the intermodule bulkhead coupling;

a module oil seal, having a cylindrical wall with one end substantially closed and the other end open, the wall defining a cavity, the open end having an annular face plate extending outwardly from the periphery of the wall, the face plate surface distal from the closed end of the module oil seal being a face seal;

one orifice through the substantially closed end of the module oil seal, the orifice adapted to receive a check valve;

an opening through the substantially closed end for receiving optical fibers; and an O-ring in proximate registration with the face seal;

wherein the module oil seal except for the face plate is reciprocally mounted within the clevis, and the face plate is reciprocally mounted within the bulkhead coupling such that the face seal abuts an adjacent surface of the coupling to make a seal.

16. An optical fiber hydrophone module comprising:

an optical hydrophone assembly comprising a plurality of mandrels helically wrapped with optical fiber and connected in linear relation;

a woven fiber protection cable assembly proximate to an end of the hydrophone assembly and comprising an elastic woven strap;

an intermodule bulkhead coupling at the end of the module;

a clevis mounted to the intermodule bulkhead coupling;

a module oil seal having a substantially cylindrical wall that defines a cavity with one end open and the other end closed with at least one generally cylindrical opening through the substantially closed end for receiving optical fibers;

a fiber seal disposed in the module oil seal opening, the fiber seal having a substantially cylindrical wall defining a void for receiving bare optical fibers, the fiber seal having a first end and a second end, the first end disposed within the module oil seal, and having an O-ring around its periphery for forming a seal with the module oil seal opening;

potting compound within the fiber seal, for sealing between the optical fibers and the wall of the fiber seal;

a fiber seal retainer, having a first end and a second end, the first end being threaded into the module oil seal opening over the fiber seal;

a tube containing the optical fibers extending from the woven fiber protection cable assembly to the fiber seal retainer;

a compressive tube stop, having a substantially cylindrical wall defining a void adapted to receive the optical fiber tube, the tube stop having a first end and a second end, the tube stop first end reciprocally received in the fiber seal retainer second end, the tube stop first end having at least one slot across its first end diameter for allowing compression of the tube stop first end within the fiber seal retainer second end to a snug fit; and a retainer cap having a substantially cylindrical wall with one end open and the other end substantially closed, with at least one orifice through the substantially closed end for receiving optical fibers, the retainer cap open end being threaded over the fiber seal retainer second end.

17. A method of assembling a termination assembly for use in an optical fiber hydrophone module, the module comprising an optical hydrophone assembly, a woven fiber protection cable assembly proximate to an end of the hydrophone assembly, an intermodule bulkhead coupling at an end of the hydrophone module, and a clevis mounted to the intermodule bulkhead coupling, the hydrophone assembly comprising a plurality of mandrels helically wrapped with optical fiber and connected in linear relation, the woven fiber protection cable assembly comprising an elastic woven strap with one looped end, the looped end of the woven fiber protection cable assembly disposed at least partially within the clevis and towards the bulkhead coupling, the method comprising the steps of:

providing a module oil seal, the module oil seal having a cylindrical wall with one end substantially closed and the other end open, the wall defining a cavity, the open end having an annular face plate extending outwardly from the periphery of the wall, the face plate surface distal from the closed end of the module oil seal being a face seal;

inserting the module oil seal substantially closed end into the clevis whereby the module oil seal except for the face plate is reciprocally mounted within the clevis, and;

providing an O-ring in proximate registration with the face seal; and mounting the intermodule bulkhead coupling to the clevis, whereby the face plate is reciprocally mounted within the bulkhead coupling, compressing the O-ring to make a seal between the intermodule mechanical coupling and the clevis.

18. A method of assembling a termination assembly as recited in claim 17, further comprising the steps of:

providing one orifice through the substantially closed end of the module oil seal, the orifice adapted to receive a check valve; and inserting a check valve in the orifice.

19. A method of assembling a termination assembly as recited in claim 18, further comprising the steps of:

providing an opening through the substantially closed end of the module oil seal for receiving optical fibers;

providing a retractable coiled tube housed within the cavity, adapted to receive optical fibers from the opening through the substantially closed end of the module oil seal.

20. A method of assembling a termination assembly as recited in claim 19, further comprising the step of fastening the substantially closed end of the module oil seal to the looped end of the woven fiber protection cable assembly.

21. A method of assembling a termination assembly as recited in claim 20, further comprising the step of filling the module with the module fill fluid through the check valve.

22. A method of assembling a termination assembly as recited in claim 21, further comprising the steps of:

inserting a fiber seal adapted to be received in the module oil seal opening, the fiber seal having a substantially cylindrical wall defining a void for receiving bare optical fibers, the fiber seal having a first end and a second end, the first end disposed within the module oil seal, and having an O-ring around its periphery for forming a seal with the module oil seal opening;

packing the void in the fiber seal with potting compound, for sealing between the optical fibers and the wall of the fiber seal;

threading a fiber seal retainer, having a first threaded end and a second end, into the module oil seal opening over the fiber seal;

extending a tube containing the optical fibers from the woven fiber protection cable assembly to the fiber seal retainer;

reciprocally mounting a compressive tube stop to the fiber seal retainer second end, the compressive tube stop having a substantially cylindrical wall defining a void adapted to receive the optical fiber tube, the tube stop having a first end and a second end, the tube stop first end having at least one slot across its first end diameter for allowing compression of the tube stop first end within the fiber seal retainer second end to a snug fit; and mounting a retainer cap having a substantially cylindrical wall with one threaded end open and the other end substantially closed, with at least one orifice through the substantially closed end for receiving optical fibers, to the fiber seal retainer second end.

* * * * *